US012812130B2

(12) United States Patent
Pan et al.

(10) Patent No.: US 12,812,130 B2
(45) Date of Patent: Nov. 24, 2026

(54) IMAGE ENCODING METHOD AND DEVICE, AND IMAGE DECODING METHOD AND DEVICE

(71) Applicant: HANGZHOU HIKVISION DIGITAL TECHNOLOGY CO., LTD., Hangzhou (CN)

(72) Inventors: Dongping Pan, Hangzhou (CN); Yucheng Sun, Hangzhou (CN); Xiaoyang Wu, Hangzhou (CN); Fangdong Chen, Hangzhou (CN)

(73) Assignee: HANGZHOU HIKVISION DIGITAL TECHNOLOGY CO., LTD., Hangzhou (CN)

(*) Notice: Subject to any disclaimer, the term of this patent is extended or adjusted under 35 U.S.C. 154(b) by 0 days.

(21) Appl. No.: 18/998,338

(22) PCT Filed: Jul. 25, 2023

(86) PCT No.: PCT/CN2023/109187
§ 371 (c)(1),
(2) Date: Jan. 24, 2025

(87) PCT Pub. No.: WO2024/022359
PCT Pub. Date: Feb. 1, 2024

(65) Prior Publication Data

US 2026/0046418 A1 Feb. 12, 2026

(30) Foreign Application Priority Data

Jul. 27, 2022 (CN) ......................... 202210894255.1

(51) Int. Cl.
*H04N 19/152* (2014.01)
*H04N 19/103* (2014.01)
(Continued)

(52) U.S. Cl.
CPC ......... *H04N 19/152* (2014.11); *H04N 19/103* (2014.11); *H04N 19/124* (2014.11); *H04N 19/176* (2014.11)

(58) Field of Classification Search
CPC .. H04N 19/152; H04N 19/103; H04N 19/124; H04N 19/176
See application file for complete search history.

(56) References Cited

U.S. PATENT DOCUMENTS

| | | | |
|---|---|---|---|
| 5,159,447 A | 10/1992 | Hskell et al. | |
| 2016/0301950 A1* | 10/2016 | Jacobson | ............ H04N 19/186 |

(Continued)

FOREIGN PATENT DOCUMENTS

| | | |
|---|---|---|
| CN | 101193301 A | 6/2008 |
| CN | 107040780 A | 8/2017 |

(Continued)

OTHER PUBLICATIONS

Extended European Search Report in European Appln. No. 23845568.7, mailed on Oct. 21, 2025, 14 pages.

(Continued)

*Primary Examiner* — Jonathan R Messmore
(74) *Attorney, Agent, or Firm* — Fish & Richardson P.C.

(57) ABSTRACT

An image decoding method, includes: parsing a bitstream of a to-be-decoded block, and determining whether an image block corresponding to the to-be-decoded block is in a fallback mode in a case that the bitstream of the to-be-decoded block comprises a first codeword; determining a fixed code length of each component of the to-be-decoded block based on an exceeded code length of the bitstream buffer in a case that the image block corresponding to the to-be-decoded block is in the fallback mode and a stored code length of the bitstream buffer exceeds the set overflow line; and decoding the to-be-decoded block by parsing the (Continued)

pixels on each component of the to-be-decoded block in accordance with the fixed code length of the component, thereby avoiding overflowing of the bitstream.

18 Claims, 5 Drawing Sheets

(51) Int. Cl.
*H04N 19/124* (2014.01)
*H04N 19/176* (2014.01)

(56) References Cited

U.S. PATENT DOCUMENTS

| | | | | |
|---|---|---|---|---|
| 2021/0398563 | A1* | 12/2021 | Chandok | G11B 27/005 |
| 2022/0201288 | A1 | 6/2022 | Shim | |

FOREIGN PATENT DOCUMENTS

| | | | |
|---|---|---|---|
| CN | 107409219 | A | 11/2017 |
| CN | 107864379 | A | 3/2018 |
| CN | 116074516 | A | 5/2023 |
| CN | 116074539 | A | 5/2023 |
| CN | 116489360 | A | 7/2023 |
| EP | 4539459 | A1 | 4/2025 |
| JP | H 06152984 | A | 5/1994 |
| JP | 5068243 | B2 | 11/2012 |
| JP | 2018516491 | A | 6/2018 |

OTHER PUBLICATIONS

Office Action in Japanese Appln. No. 2025-504535, mailed on Dec. 16, 2025, 8 pages (with English translation).
VDC-M Standard, "VESA Display Compression-M (VDC-M) Standard," Version 1.1, May 11, 2018, 173 pages.
International Search Report in International Appln. No. PCT/CN2023/109187, mailed on Nov. 1, 2023, 6 pages (with English translation).

* cited by examiner

IMAGE ENCODING METHOD AND DEVICE, AND IMAGE DECODING METHOD AND DEVICE

CROSS-REFERENCE TO RELATED APPLICATION

This application is the U.S. national phase application of International Application No. PCT/CN2023/109187, filed on Jul. 25, 2023, which claims a priority of the Chinese patent application No. 202210894255.1, filed on Jul. 27, 2022, and the disclosures of which are incorporated herein by reference in its entirety.

TECHNICAL FIELD

The examples of the present disclosure relate to the field of video encoding and decoding, and in particular, relates to an image encoding method and apparatus and an image decoding method and apparatus.

BACKGROUND

A video encoding technology, also known as a video compression technology, is used to reduce a data bandwidth of video signals. A video is a sequence of continuous images made up of successive image frames, where one image frame is one image. Due to a persistence effect of human vision, when a sequence of frames are played at a certain bitrate, what the human eye sees is a continuous video. Encoding and decoding the video means encoding and decoding the image of each frame in the video. Taking the image of one frame as an example, in an encoding-side device, an image encoder encodes the image, and obtains and transmits a bitstream corresponding to the image to a decoding-side device. In the decoding-side device, an image decoder parses the bitstream to reconstruct the image.

In the image encoding and decoding process, all the general video compression technologies adopt variable-length code to improve compression efficiency. After a video sequence is compressed and encoded, a variable-bitrate bitstream is obtained and is not suitable for a real-time transmission over a fixed-bitrate channel. Therefore, the variable-bitrate data generated by the encoder is usually outputted to a buffer with a certain storage space first, and then outputted from the buffer at a fixed bitrate. It is to be understood that the size of the buffer's storage space is fixed. If the bitstream data inputted to the buffer is too large, which causes the data to be temporarily stored in the buffer to exceed the size of its storage space, a bitstream “overflow” will occur, resulting in subsequent image information loss.

Therefore, how to control the bitrate generated by the encoder based on the remaining storage space of the buffer during the image encoding and decoding process is a pressing issue to be addressed today.

SUMMARY

Examples of the present disclosure provide an image encoding method and apparatus and an image decoding method and apparatus, which can be used to avoid a bitstream overflow.

In order to achieve the above purpose, the examples of the present disclosure adopt the following technical solutions.

In a first aspect, an example of the present disclosure provides an image decoding method, performed by a decoding-side device, and the method includes: parsing a bitstream of a to-be-decoded block, and determining whether an image block corresponding to the to-be-decoded block is in a fallback mode in a case that the bitstream of the to-be-decoded block includes a first codeword, wherein a code length of the to-be-decoded block is less than a maximum code length of the to-be-decoded block, the maximum code length is determined based on a set overflow line of a bitstream buffer, and the set overflow line indicates a maximum storage space allowed to be occupied by bitstreams in the bitstream buffer, and wherein the first codeword indicates the fallback mode or a sample value mode; determining a fixed code length of each component of the to-be-decoded block based on an exceeded code length of the bitstream buffer in a case that the image block corresponding to the to-be-decoded block is in the fallback mode and a stored code length of the bitstream buffer exceeds the set overflow line, wherein the to-be-decoded block includes one or more components, and for a first component of the to-be-decoded block, the fixed code length of the first component indicates a code length required for parsing a single pixel of the first component, and wherein the exceeded code length of the bitstream buffer is a code length that the stored code length of the bitstream buffer exceeds the set overflow line; and decoding the to-be-decoded block by parsing the pixels on each component in accordance with the fixed code length of the component.

The image decoding method provided by the example of the present disclosure has at least the following beneficial effects. When the fallback mode is adopted by the encoding-side device, the decoding-side device may decode the to-be-decoded block in the fallback mode. Depending on the remaining memory of the bitstream buffer, it can avoid a bitstream overflow or a bitstream underflow, and thereby avoid the loss of image information of the to-be-decoded block.

In a second aspect, an example of the present disclosure provides an image encoding method, performed by an encoding-side device, and the method includes: acquiring a maximum code length of a to-be-encoded block, wherein the maximum code length is determined based on a set overflow line of a bitstream buffer, and the set overflow line indicates a maximum storage space allowed to be occupied by bitstreams in the bitstream buffer; obtaining a first code length of the to-be-encoded block by pre-encoding the to-be-encoded block, wherein the first code length is a length of a bitstream obtained after pre-encoding the to-be-encoded block; and encoding the to-be-encoded block in a fallback mode in a case that the first code length is greater than or equal to the maximum code length, wherein a code length obtained by encoding the to-be-encoded block in the fallback mode is less than the maximum code length, and wherein a bitstream obtained by encoding the to-be-encoded block in the fallback mode includes a first codeword, and the first codeword indicates the fallback mode or a sample mode.

In the method according to the example, it may first pre-encode the to-be-encoded block, compare the length of the bitstream obtained through the pre-encoding with the code length allowed to be occupied by the to-be-encoded block, and determine whether a bitstream overflow occurs according to the comparison result. Furthermore, when it is determined that the bitstream overflow occurs, it is to encode the to-be-encoded block in the fallback mode, so as to avoid the loss of image information of the to-be-encoded block.

In a third aspect, the present disclosure provides a decoding-side device, including one or more processors, and one or more memories that are configured to store computer instructions. The one or more processors are configured to call from the one or more memories and execute the computer instructions to: parse a bitstream of a to-be-decoded block, and determine whether an image block corresponding to the to-be-decoded block is in a fallback mode in a case that the bitstream of the to-be-decoded block comprises a first codeword, wherein a code length of the to-be-decoded block is less than a maximum code length of the to-be-decoded block, the maximum code length is determined based on a set overflow line of a bitstream buffer, and the set overflow line indicates a maximum storage space allowed to be occupied by bitstreams in the bitstream buffer, and wherein the first codeword indicates the fallback mode or a sample mode; determine a fixed code length of each component of the to-be-decoded block based on an exceeded code length of the bitstream buffer in a case that the image block corresponding to the to-be-decoded block is in the fallback mode and a stored code length of the bitstream buffer exceeds the set overflow line, wherein the to-be-decoded block comprises one or more components, and for a first component of the to-be-decoded block, the fixed code length of the first component indicates a code length required for parsing a single pixel of the first component, and wherein the exceeded code length of the bitstream buffer is a code length that the stored code length of the bitstream buffer exceeds the set overflow line; and decode the to-be-decoded block by parsing the pixels on each component in accordance with the fixed code length of the component.

Based on the implementations provided in the various aspects of the present disclosure, they may be further combined to provide more implementations. In other words, any possible implementation in any one of the above aspects may be applied to other aspects without conflict, so as to obtain one or more new examples. For example, any one of the image decoding methods provided in the first aspect may be combined with others in pairs or in three without conflict, so as to obtain one or more new image decoding methods.

DETAILED DESCRIPTION OF THE EMBODIMENTS

Hereinafter, the technical solutions in the examples of the present disclosure will be described clearly and completely with reference to the accompanying drawings of the examples of the present disclosure. Obviously, the described examples are merely a part of the examples of the present disclosure, rather than all of the examples. Based on the examples of the present disclosure, all other examples obtained by a person of ordinary skill in the art without creative efforts all belong to the scope of protection of the present disclosure.

In the descriptions of the present disclosure, "/" means "or," unless otherwise indicated. For example, A/B may mean A or B. The term "and/or" here only refers to an association relationship for describing associated objects, which indicates that there may be three types of relationships. For example, A and/or B means that A exists alone, A and B exist at the same time, and B exists alone. In addition, "at least one" means one or more, and "multiple" means two or more. The words "first," "second," etc. do not limit any quantity or execution order, and the words "first," "second," etc. do not necessarily mean that they are different.

It is to be noted that, the words such as "illustrative" or "for example" in the present disclosure represent an example, an illustration or a description. Any example or designed solution described by "illustrative" or "for example" in the present disclosure should not be construed as preferred or advantageous over other examples or designed solutions. Rather, the use of the words such as "illustrative" or "for example" are intended to present the relevant concepts in a concrete way.

A system architecture to which the examples of the present disclosure are applied is described below.

Figure 1:
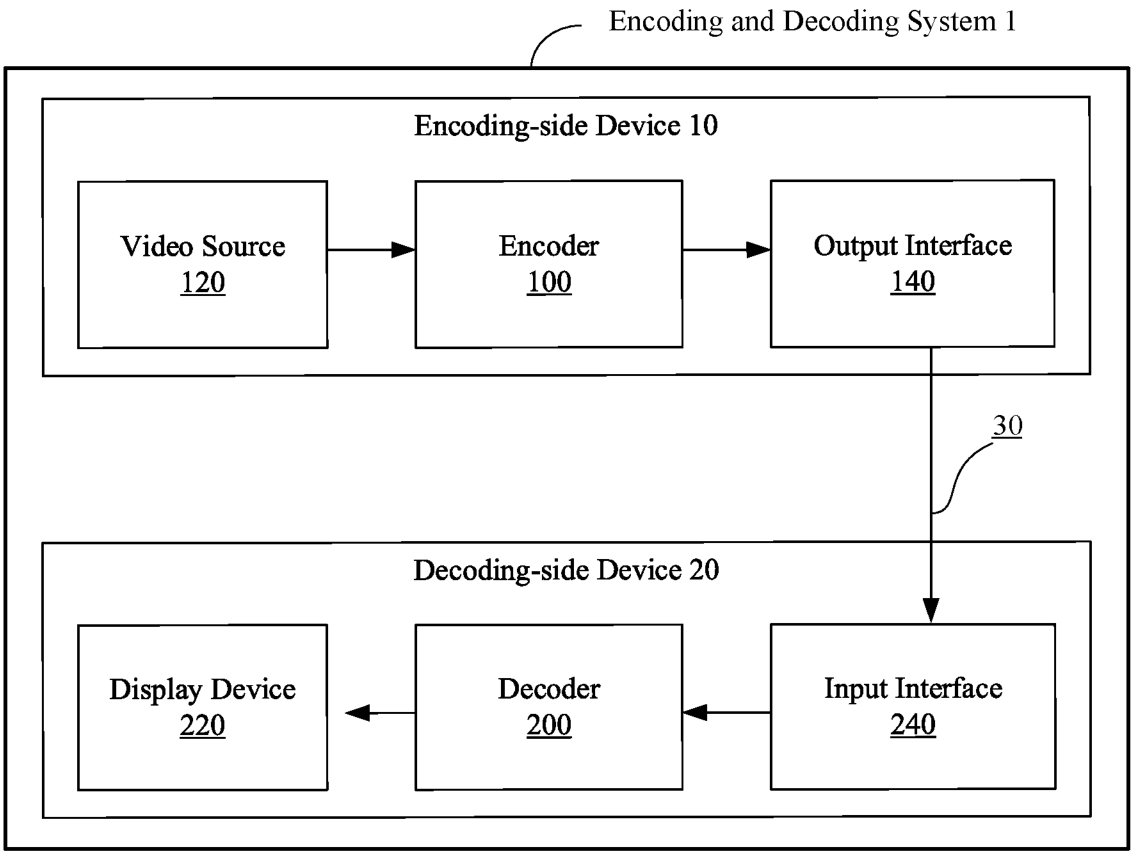
FIG. 1 is a schematic architectural diagram of an encoding and decoding system 1 to which examples of the present disclosure are applied.

Referring to FIG. 1, FIG. 1 illustrates a schematic architectural diagram of an encoding and decoding system 1 to which the examples of the present disclosure are applied. As illustrated in FIG. 1, the encoding and decoding system 1 may include an encoding-side device 10 and a decoding-side device 20. The encoding-side device 10 generates encoded video data.

Therefore, the encoding-side device 10 may be referred as to an encoding apparatus. The decoding-side device 20 may decode the encoded video data generated by the encoding-side device 10. Therefore, the decoding-side device 20 may be referred to as a decoding apparatus.

The specific forms of the encoding-side device 10 and the decoding-side device 20 may be various apparatuses, including desktop computers, mobile computing devices, notebook (e.g., laptop) computers, tablet computers, set-top boxes, telephone handsets such as so-called "smart" phones, televisions, cameras, display devices, digital media players, video game consoles, vehicle-mounted computers, or the like.

In one or more examples, the encoding-side device 10 and the decoding-side device 20 in FIG. 1 may be two separate devices. Alternatively, the encoding-side device 10 and the decoding-side device 20 may be the same device, that is, the encoding-side device 10 or its corresponding functions and the decoding-side device 20 or its corresponding functions may be integrated on the same device.

The encoding-side device 10 and the decoding-side device 20 may communicate with each other. For example, the decoding-side device 20 may receive the encoded video data from the encoding-side device 10 via a link 30. The link 30 may include one or more media or devices capable of moving the encoded video data from the encoding-side device 10 to the decoding-side device 20. In an example, the link 30 may include one or more communication media that enable the encoding-side device 10 to transmit the encoded video data directly to the decoding-side device 20 in real-time. In this example, the encoding-side device 10 may modulate the encoded video data according to a communication standard (e.g., a wireless communication protocol), and may transmit the modulated video data to the decoding-side device 20. The one or more communication media may include wireless and/or wired communication media, for example, radio frequency (RF) spectrum or one or more physical transmission lines. The one or more communication media may form part of a packet-based network, for example, a local area network, a wide area network, or a global network (e.g., Internet). The one or more communication media may include a router, a switch, a base stations, or other devices that facilitate the communication from the encoding-side device 10 to the decoding-side device 20.

In one or more examples, the encoding-side device 10 may output the encoded data from an output interface 140 to a built-in or external storage device. The storage device may include any one of various distributed or locally accessed data storage media, for example, a hard drive, a Blu-ray disc, a digital video disc (DVD), a compact disc read-only memory (CD-ROM), a flash memory, a volatile or non-volatile memory, or any other suitable digital storage medium for storing the encoded video data.

As illustrated in FIG. 1, the encoding-side device 10 includes a video source 120, an encoder 100 and an output interface 140. In some examples, the output interface 140 may include a modulator/demodulator (modem) and/or a transmitter. The video source 120 may include a video capture device (e.g., a camera), a video archive containing previously captured video data, a video feed interface for receiving the video data from a video content provider, and/or a computer graphic system for generating the video data, or a combination of these video data sources. The encoder 100 may encode the video data from the video source 120. In some examples, the encoding-side device 10 transmits the encoded video data directly to the decoding-side device 20 via the output interface 140. In other examples, the encoded video data may also be stored in a storage device for being accessed later by the decoding-side device 20 to be decoded and/or played.

As illustrated in FIG. 1, the decoding-side device 20 includes an input interface 240, a decoder 200 and a display device 220. In some examples, the input interface 240 includes a receiver and/or a modem. The input interface 240 may receive the encoded video data via the link 30 and/or from the storage device. The display device 220 may be integrated in or external to the decoding-side device 20. In general, the display device 220 displays decoded video data. The display device 220 may be of various types, such as a liquid crystal display (LCD), a plasma display, an organic light-emitting diode (OLED) display, or a display device of another type.

In one or more examples, the encoding-side device 10 further includes a bitstream buffer (not shown in FIG. 1), which is configured to receive bitstream data generated by encoding and output the bitstream data at a fixed bitrate. The size of the bitstream data generated after encoding different to-be-encoded blocks may vary greatly based on the properties of the to-be-encoded blocks. Therefore, after a video sequence is compressed and encoded, a variable-bitrate bitstream is obtained and is not suitable for a real-time transmission over a fixed-bitrate channel. The bitrate changes in the compressed video may be smoothed out by the bitstream buffer. The larger a storage space of the bitstream buffer is, the more it can withstand bitrate fluctuations.

In one or more examples, the decoding-side device 20 may include another buffer, which may be configured to receive fixed-bitrate bitstream data, and output it from the buffer to a bitstream parsing unit 201 of the decoder 200.

Although not shown in FIG. 1, in some aspects, the encoder 100 and the decoder 200 may be integrated with an audio encoder and an audio decoder, respectively, and may include appropriate multiplexer-demultiplexer units or other hardware and software, so as to handle the encoding of both audio and video in a shared data stream or in a dedicated data stream.

It is to be understood that the encoding and decoding system 1 illustrated in FIG. 1 is only an example, and the technology of the present disclosure may be applicable to a video transcoding setting (e.g., the video encoding or the video decoding) that does not necessarily include any data communication between the encoding apparatus and the decoding apparatus. In other examples, the data may be retrieved from a local memory, streamed over a network, and so on. The encoding apparatus may encode and store the data to the memory, and/or the video decoding apparatus may retrieve the data from the memory and decode the data. In many examples, the encoding and the decoding are performed by the devices that do not communicate with each other but merely encode the data to the memory and/or retrieve from the memory and decode the data.

The specific structures of the encoder 100 and the decoder 200 in FIG. 1 are briefly introduced below in conjunction with the accompanying drawings of the specification.

Figure 2:
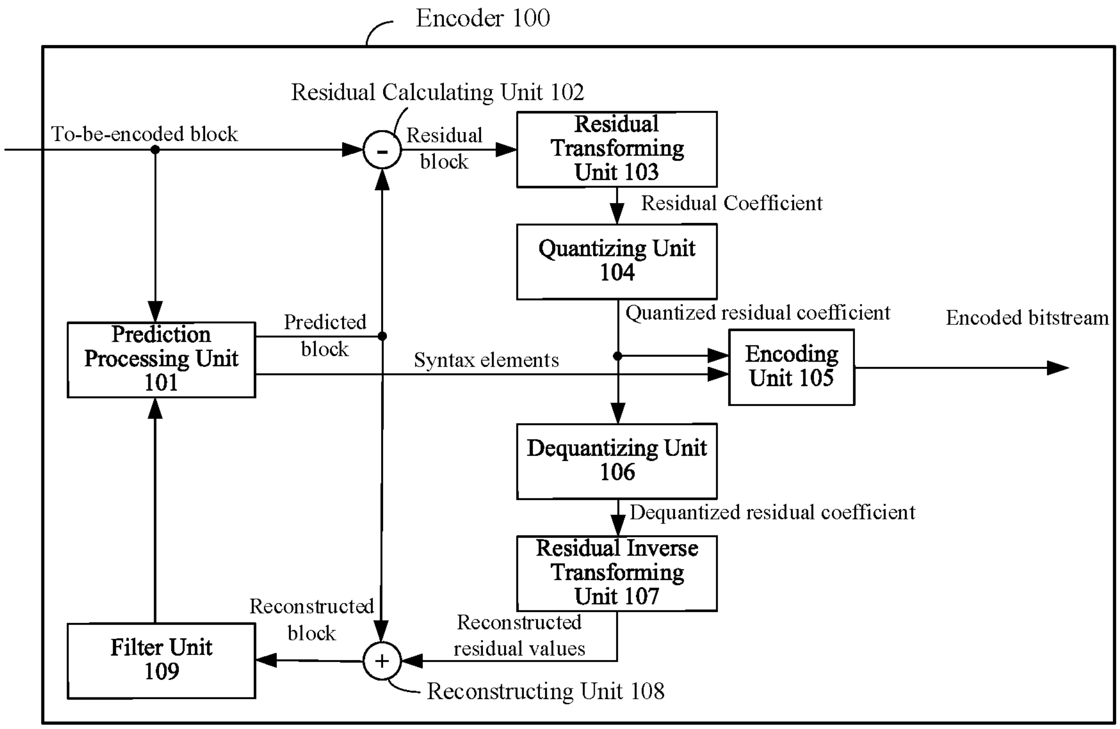
FIG. 2 is a schematic block diagram of an example of an encoder 100 for implementing the methods according to examples of the present disclosure.

Referring to FIG. 2, FIG. 2 illustrates a schematic block diagram of an example of an encoder 100 for implementing the methods according to the examples of the present disclosure. As illustrated in FIG. 2, the encoder 100 includes a prediction processing unit 101, a residual calculating unit 102, a residual transforming unit 103, a quantizing unit 104, an encoding unit 105, a dequantizing unit (also called an inverse quantizing unit) 106, a residual inverse transforming unit 107, a reconstructing unit (or called a rebuilding unit) 108 and a filter unit 109.

In an example, the input of the encoder 100 is an image block of a to-be-encoded image (i.e., a to-be-encoded block or a coding unit (CU)).

In another example, the input of the encoder 100 is a to-be-encoded image, and the encoder 100 may further include a partitioning unit (not shown in FIG. 2), which is configured to partition the to-be-encoded image into multiple image blocks. The encoder 100 is used to encode the multiple image blocks of the to-be-encoded image block by block, thereby completing the encoding of the to-be-encoded image. For example, the encoder 100 performs an encoding process on each image block, thereby completing the encoding of the to-be-encoded image.

As an example, an approach for partitioning the to-be-encoded image into multiple image blocks may include the following steps.

At step 11, a frame of image is partitioned into one or more slices that do not overlap with each other. One slice includes multiple coding units. There is no dependency between the slices and they may be encoded and decoded in parallel/independently.

At step 12, for each slice, the encoding-side device may partition it into one or more independent coding units that do not overlap with each other. The independent coding units may not depend on each other, but may share some header information of one or more parallel coding units.

At step 13, for each independent coding unit, the encoding-side device may further partition it into one or more coding units that do not overlap with each other. For partitioning the independent coding unit into multiple coding units that do not overlap with each other, the partitioning scheme may include a horizontal equal partitioning scheme, a vertical equal partitioning scheme, or a horizontal and vertical equal partitioning scheme. Of course, the specific implementation is not limited to these. The various coding units within the independent coding unit may be interdependent, i.e., may refer to each other during performing a prediction step.

The width of the coding unit is w_cu and the height is h_cu. In one or more examples, the width is greater than the height (unless at an edge area). Typically, the coding unit may be of a fixed w_cu×h_cu. The w_cu and the h_cu are both Nth power of 2 (N is greater than or equal to 0), like 16×4, 8×4, 16×2, 8×2, 4×2, 8×1, 4×1, etc.

The coding unit may include three components of luminance Y, chrominance Cb, and chrominance Cr (or three components of red R, green G, and blue B, or three components of luminance Y, chrominance U, and chrominance V), or may include only one of the components. If it contains three components, the sizes of the various components may be exactly identical or different, which depends on an image input format.

Figure 3:
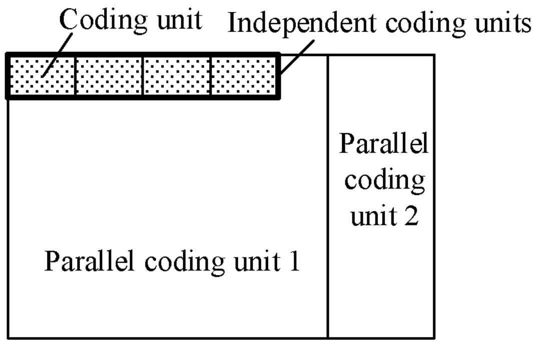
FIG. 3 is a schematic diagram of a correspondence of an image, parallel coding units, independent coding units, and coding units provided in an example of the present disclosure.

As illustrated in FIG. 3, it is a schematic diagram of a correspondence of an image, parallel coding units, independent coding units, and coding units. FIG. 3 illustrates an example in which one image is partitioned into parallel coding unit 1 and parallel coding unit 2 at a 3:1 ratio, and one independent coding unit includes four coding units.

In one or more examples, the partitioning unit partitions the to-be-encoded image into multiple image blocks, and these image blocks may be further partitioned into smaller blocks, for example, to partition the image block based on a quadtree structure or a binary tree structure. In addition, the partition may also include partitioning into tiles, slices, or other larger units. The tile may be partitioned into multiple image blocks (or may be partitioned into the slices, where a collection of image blocks is called the slice).

The prediction processing unit 101 is used to receive or acquire original values of the to-be-encoded block and reconstructed image data, and make a prediction about the to-be-encoded block based on the correlated data in the reconstructed image data to obtain a predicted block of the to-be-encoded block.

In one or more examples, the prediction processing unit 101 may include an inter-frame predictor and an intra-frame predictor. The inter-frame predictor may determine an inter-frame prediction mode for encoding the to-be-encoded block, predict motion information such as a motion vector (MV) of one or more subblocks of the current image block in the determined inter-frame prediction mode, and use the motion information (e.g., the motion vector) of the one or more subblocks of the current image block to acquire or generate the predicted block of the current image block. The intra-predictor may determine an intra prediction mode for encoding the to-be-encoded block.

The intra-frame prediction refers to a prediction using one or more encoded blocks of the current image block based on a correlation in a video spatial domain, so as to achieve the purpose of removing the redundancy in the video spatial domain. As an example, the intra-frame prediction specifies multiple prediction modes, with each prediction mode corresponding to a texture direction (except a direct (DC) mode). For example, if the image texture is arranged horizontally, the horizontal prediction mode may predict the image information better.

The inter-frame prediction refers to predicting pixels of the current image by using adjacent encoded image pixels based on a time domain correlation of the video due to strong time domain correlation of a video sequence, which may achieve the purpose of effectively removing a video time domain redundancy. The inter-frame prediction part of various video encoding standards adopts a block-based motion compensation technology. The main principle is to find a best matching block from one or more previously encoded images for each pixel block of the current image. This process is called motion estimation (ME).

In addition, in the inter-frame prediction mode, the motion vectors may be used to represent a relative shift between the current to-be-encoded block and the best matching block in its reference image. Each partitioned block has the corresponding motion vectors transmitted to the decoding-side device. If the motion vectors of each block are encoded and transmitted independently, especially when small-sized blocks are partitioned, a considerable number of bits are consumed. In order to reduce the number of bits used to encode the motion vectors, the spatial correlation between the adjacent image blocks is used to predict the motion vectors of the current to-be-encoded block according to the motion vectors of its adjacent encoded block, and then a prediction difference is encoded. In this way, the number of bits representing the motion vectors may be effectively reduced. In encoding the motion vectors of the current to-be-encoded block, the motion vectors of the current to-be-encoded block are first predicted using the motion vectors of the adjacent encoded block, and then differences (motion vector differences (MVDs)) between motion vector prediction (MVP) values and true motion vector estimations are encoded, thereby effectively reducing the number of bits for encoding the MVs.

The residual calculating unit 102 is used to calculate residual values between the original values of the to-be-encoded block and the predicted block of the to-be-encoded block to obtain a residual block (RB). For example, the pixel values of the predicted block are subtracted from the original pixel values of the to-be-encoded block pixel by pixel.

In an example, the residual transforming unit 103 is used to determine a residual coefficient based on the residual block. In one or more examples, the process may include: performing a transform on the residual block, such as a discrete cosine transform (DCT) or a discrete sine transform (DST), so as to obtain a transform coefficient in the transform domain. The transform coefficient may also be referred to as a transform residual coefficient or a residual coefficient. The residual coefficient may represent the residual block in the transform domain. Of course, the residual transforming step may be not included in the process that the encoder 100 encodes the to-be-encoded block.

The quantizing unit 104 is used to quantize the transform coefficient or the residual values by applying a scalar quantization or a vector quantization, so as to obtain a quantized residual coefficient (or quantized residual values). The quantizing process may reduce a bitdepth associated with some or all of the residual coefficient. For example, a p-bit transform coefficient may be rounded down to a q-bit transform coefficient in the quantization process, where p is greater than q. The quantization degree may be changed by adjusting a quantization parameter (QP). For example, for the scalar quantization, different scales may be applied to achieve finer or coarser quantization. A smaller quantization step size corresponds to the finer quantization, while a larger quantization step size corresponds to the coarser quantization. The appropriate quantization step size may be indicated by the QP.

In order to achieve the image compression in the image encoding process, it usually quantizes the residual block of the to-be-encoded block or quantizes the residual coefficient block obtained after a certain treatment on the residual block, so that the quantized residual block or residual coefficient block can be encoded with fewer bits. It is to be understood that the residual block is a residual value block obtained based on the original pixel block and the predicted block of the to-be-encoded block, and the residual coefficient block is a coefficient block obtained after a certain treatment and transformation are performed on the residual block.

As an example in which the encoder 100 quantizes the residual block, the encoder 100 may divide each residual value of the residual block of the to-be-encoded block by a quantization coefficient, so as to scale down the residual values of the residual block. In this way, compared with the unquantized residual values, the residual values scaled down after the quantization may be encoded by fewer bits, thereby achieving the image compression encoding.

The encoding unit 105 is used to encode the quantized residual coefficient (or the quantized residual values) and output the encoded image data (i.e., an encoded result of the current to-be-encoded block) in the form of an encoded bitstream (or called bit stream). The encoded bitstream may then be transmitted to the decoder, or may be stored for subsequently being transmitted to the decoder or for retrieval. The encoding unit 105 may also be used to encode syntax elements of the to-be-encoded block, for example, encoding the prediction mode adopted by the to-be-encoded block into the bitstream.

In an example, a feasible scheme for the encoding unit 105 to encode the residual coefficient is a semi-fixed length encoding scheme. First, a maximum residual absolute value of one residual block is defined as a modified maximum (mm). The number of bits for encoding the residual coefficient of the RB is determined (with the number of bits for encoding the residual coefficient in the same RB being consistent). For example, if the code length (CL) of the current RB is 2 and the current residual coefficient is 1, 2 bits are required to encode the residual coefficient being 1, which is represented by 01. If the CL of the current RB is 9, it means encoding an 8-bit residual coefficient and a 1-bit sign bit. The CL is determined by finding the minimum M that satisfies that all residual values of the current subblock are within the range of [−2^(M−1), 2^(M−1)]. If both of two boundary values of −2^(M−1) and 2^(M−1) exist, M should be increased by 1, that is, M+1 bits are required to encode all the residual values of the current RB. If only one of the two boundary values of −2^(M−1) and 2^(M−1) exists, a Trailing bit is required to be encoded, so as to determine the boundary value to be −2^(M−1) or 2^(M−1). If neither of the two boundary values of −2^(M−1) and 2^(M−1) exists in all the residual values, no Trailing bit is required to be encoded.

Of course, other residual coefficient encoding schemes may also be adopted, such as an exponential Golomb encoding scheme, a Golomb-Rice encoding scheme, a truncated unary code encoding scheme, a run-length encoding scheme, or an original residual value direct encoding scheme.

In addition, for some special cases, instead of the residual values, the original values may be directly encoded.

The dequantizing unit 106 is used to perform a dequantization on the quantized residual coefficient (or the quantized residual values) to obtain a dequantized residual coefficient (dequantized residual values). The dequantization is a reverse application of the quantizing unit 104. For example, an inverse quantization scheme of the quantization scheme applied by the quantizing unit 104 is applied based on or using the same quantization step size as the quantizing unit 104.

The residual inverse transforming unit 107 is used to perform an inverse transform (or an anti-transform) on the dequantized residual coefficient to obtain a reconstructed residual block. In one or more examples, the anti-transform may include an inverse discrete cosine transform or an inverse discrete sine transform. In this way, inverse transformed values obtained after the inverse transform (or the anti-transform) is performed on the dequantized residual coefficient are reconstructed residual values in a pixel domain (or called a sample domain). That is, after the dequantized residual coefficient block is inversely transformed by the residual inverse transforming unit 107, the obtained block is the reconstructed residual block. Of course, when the encoder 100 does not include the residual transforming unit 103, the encoder 100 may also exclude the anti-transforming step.

The reconstructing unit 108 is used to add the reconstructed residual block to the predicted block, so as to obtain a reconstructed block in the sample domain. The reconstructing unit 108 may be a summer. For example, the reconstructing unit 108 adds a residual value of the reconstructed residual block to the prediction value of the corresponding pixel in the predicted block to obtain a reconstructed value of the corresponding pixel. The reconstructed block outputted by the reconstructing unit 108 may be used to predict other to-be-encoded image blocks subsequently.

The filter unit 109 (or called "filter") is used to filter the reconstructed block to obtain a filtered block, so as to smoothly achieve a pixel conversion or improve an image quality.

In an example, the encoding process implemented by the encoder 100 may include the following steps.

At step 21, the prediction processing unit 101 determines a prediction mode, and obtain a predicted block of a to-be-encoded block by predicting the to-be-encoded block according to the determined prediction mode and a reconstructed block of an encoded image block.

The reconstructed block of the encoded image block is obtained after the dequantizing unit 106, the residual inverse transforming unit 107 and the reconstructing unit 108 sequentially process a quantized residual coefficient block of the encoded image block.

At step 22, the residual calculating unit 102 obtains a residual block of the to-be-encoded block according to the original pixel values of the prediction block and the to-be-encoded block.

At step 23, the residual transforming unit 103 transforms the residual block to obtain a residual coefficient block.

At step 24, the quantizing unit 104 quantizes the residual coefficient block to obtain a quantized residual coefficient block.

At step 25, the encoding unit 105 encodes the quantized residual coefficient block and the related syntax elements (such as the prediction mode and an encoding scheme) to obtain a bitstream of the to-be-encoded block.

Figure 4:
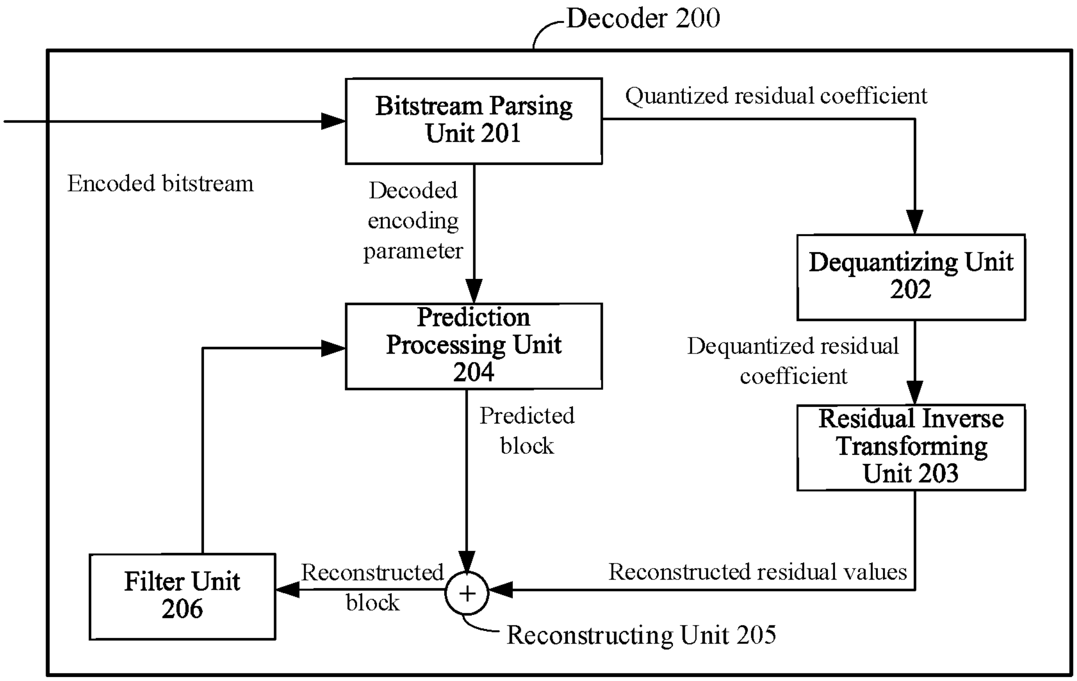
FIG. 4 is a schematic block diagram of an example of a decoder 200 for implementing the methods according to examples of the present disclosure.

Referring to FIG. 4, FIG. 4 illustrates a schematic block diagram of a decoder 200 for implementing the methods according to the examples of the present disclosure. The decoder 200 is used to receive image data (i.e., an encoded bitstream, for example, including an encoded bitstream of an image block and related syntax elements) encoded by the encoder 100 to obtain a decoded image block.

As illustrated in FIG. 4, the decoder 200 includes a bitstream parsing unit 201, a dequantizing unit 202, a residual inverse transforming unit 203, a prediction processing unit 204, a reconstructing unit 205, and a filter unit 206. In some examples, the decoder 200 may perform a decoding process that is generally the inverse of the encoding process described for the encoder 100 in FIG. 2.

The bitstream parsing unit 201 is used to decode the encoded bitstream to obtain a quantized residual coefficient (or quantized residual values) and/or one or more decoding parameters (which may, for example, include any one or all of an inter-frame prediction parameter, an intra-frame prediction parameter, a filter parameter and/or other syntax elements taken by the encoding-side device). The bitstream parsing unit 201 is further used to forward the one or more decoding parameters to the prediction processing unit 204, so that the prediction processing unit 204 performs a predicting process according to the one or more decoding parameters.

The function of the dequantizing unit 202 may be the same as that of the dequantizing unit 106 of the encoder 100, and is used to perform a dequantization (i.e., an inverse quantization) to the quantized residual coefficient decoded and outputted by the bitstream parsing unit 201.

The dequantization is an inverse process of the quantization. The dequantization refers to mapping the quantized coefficient to a reconstructed signal in an input signal space. The reconstructed signal is an approximation of the input signal. In order to reconstruct an image block from the compressed and encoded bitstream, the dequantizing unit 202 of the decoder 200 may perform the dequantization on a residual block or a residual coefficient block parsed from the bitstream, so as to reconstruct an unquantized residual block or residual coefficient block corresponding to the image block. Then, the decoder 200 obtains a reconstructed image block by reconstructing the image block according to a reconstructed residual block or residual coefficient block.

As an example in which the decoder 200 parses the quantized residual block of the to-be-decoded block from the bitstream, the decoder 200 may perform the dequantization on the residual block through the dequantizing unit 202. Specifically, the dequantizing unit 202 may multiply each residual value of the parsed residual block by a quantization coefficient to reconstruct the residual values of the unquantized residual block corresponding to the to-be-decoded block, thereby obtaining the reconstructed residual block. The quantization coefficient used for quantizing the residual block of the to-be-decoded block is a quantization coefficient that the encoding apparatus encodes the to-be-decoded block. In this way, the decoder 200 may achieve reconstructing the to-be-decoded block based on the residual block reconstructed after the dequantization, and obtain a reconstructed block of the to-be-decoded block. Those skilled in the art may understand that the to-be-encoded block is an image block to be processed in the encoding-side device, and the to-be-decoded block is an image block to be processed in the decoding-side device.

The function of the residual inverse transforming unit 203 may be the same as that of the residual inverse transforming unit 107 of the encoder 100, and is used to perform an inverse transform (for example, an inverse DCT, an inverse integer transform, or a conceptually similar inverse transform process) on the dequantized residual coefficient to obtain reconstructed residual values. The block obtained by the inverse transform is the residual block of the reconstructed to-be-decoded block in a pixel domain.

The function of the reconstructing unit 205 (e.g., a summer) may be the same as that of the reconstructing unit 108 of the encoder 100.

The prediction processing unit 204 is used to receive or acquire the encoded image data (for example, the encoded bitstream of the current image block) and reconstructed image data. The prediction processing unit 204 may also receive or acquire one or more related parameters of the prediction mode and/or information about the selected prediction mode (that is, the one or more decoding parameters) from, for example, the bitstream parsing unit 201, and obtain a predicted block of the current image block by predicting the current image block based on the correlated data and the one or more decoding parameters of the reconstructed image data.

The reconstructing unit 205 is used to add the reconstructed residual block to the predicted block to obtain the reconstructed block of the to-be-decoded image in a sample domain, for example, adding the residual values of the reconstructed residual block to prediction values of the predicted block.

The filter unit 206 is used to filter the reconstructed block to obtain a filtered block, which is a decoded image block.

Specifically, in the example of the present disclosure, the decoder 200 is used to implement the decoding methods described in the examples below.

It is to be understood that in the encoder 100 and the decoder 200 of the example of the present disclosure, a processing result at a certain stage may also be further processed and then outputted to the next stage. For example, after the stage such as an interpolation filtering, a motion vector derivation or a filtering, the processing result of the corresponding stage is further subjected to operations such as a clip or a shift.

In an example, the decoding process implemented by the decoder 200 may include the following steps.

At step 31, the bitstream parsing unit 201 parses a prediction mode and a residual encoding scheme.

At step 32, the bitstream parsing unit 201 parses one or more quantization-related values (such as a near value, or a QP value) according to the prediction mode and the residual encoding scheme.

At step 33, the dequantizing unit 202 parses a residual coefficient according to the prediction mode and the quantization-related values.

At step 34, the prediction processing unit 204 obtains a prediction value of each pixel of the current image block according to the prediction mode.

At step 35, the residual inverse transforming unit 203 performs an inverse transform on the residual coefficient to reconstruct the residual value of each pixel of the current image block.

At step 36, the reconstructing unit 205 obtains the reconstructed value of each pixel of the current coding unit based on the prediction value and the residual value of the pixel.

FIG. 1 to FIG. 4 are merely examples provided by the examples of the present disclosure. In some examples, the encoder 100, the decoder 200, and the encoding and decoding system 1 may include more or fewer components or units, which is not limited in the present disclosure.

The following image encoding and decoding methods provided in the examples of the present disclosure are described in conjunction with the accompanying drawings.

Figure 5:
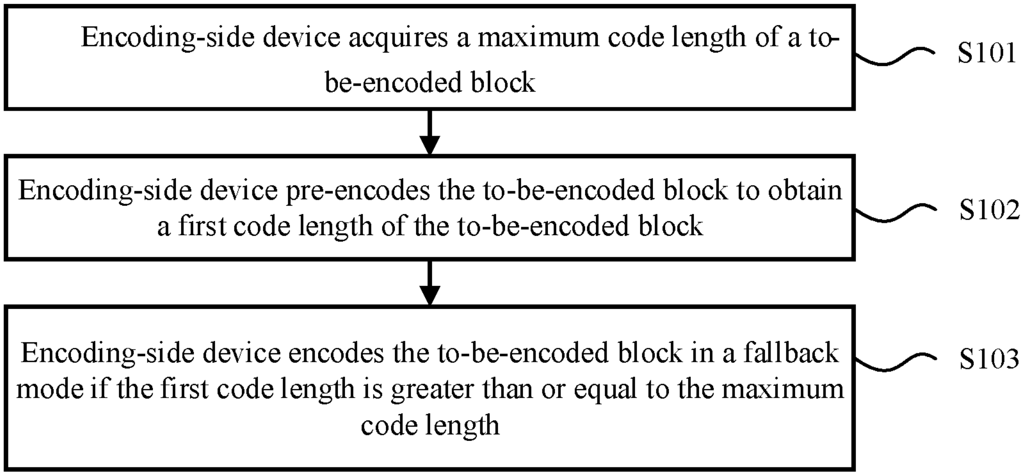
FIG. 5 is a schematic flowchart of an image encoding method provided in an example of the present disclosure.

FIG. 5 is a schematic flowchart of an image encoding method provided in an example of the present disclosure. In one or more examples, the image encoding method may be applied to the encoding and decoding system 1 illustrated in FIG. 1. The image encoding method may be performed by the encoding-side device 10. Specifically, the encoding method may be performed by the encoder 100 included in the encoding-side device 10. As illustrated in FIG. 5, the image encoding method provided in the example of the present disclosure includes the following steps.

At S101, the encoding-side device acquires a maximum code length of a to-be-encoded block.

It to be understood that a to-be-encoded video may include one or more image frames. One image frame includes one or more image blocks. In the example of the present disclosure, the current to-be-encoded block corresponds to an image block of the image to be processed (which is any one of one or more image frames), and the to-be-encoded block may be a coding unit.

In one or more examples, one to-be-encoded block may include multiple components. The component may be a luminance component or a chrominance component.

As an example, for the image block corresponding to the to-be-encoded block with a size of 16×2, the image block includes a luminance component with a size of 16×2 and two chrominance components with a size of 16×2 if the image format of the image block is YUV444.

As another example, for the image block corresponding to the to-be-encoded block with a size of 16×2, the image block includes a luminance component with a size of 16×2 and two chrominance components with a size of 8×2 if the image format of the image block is YUV422.

The maximum code length is a maximum length of a bitstream of the to-be-encoded block allowed to be buffered in a bitstream buffer and determined based on a set overflow line of the bitstream buffer. The set overflow line indicates a maximum storage space allowed to be occupied by bitstreams in the bitstream buffer.

It is to be understood that in order to prevent the bitstream from overflowing, the maximum code length may be determined according to the size of the actual storage space of the bitstream buffer in the encoding-side device of the encoding and decoding system illustrated in FIG. 1. Both the encoding-side device and the decoding-side device may determine the storage space of the encoded bitstreams allowed to be buffered in the current bitstream buffer based on the size of the actual storage space of the bitstream buffer and the set overflow line. Furthermore, both the encoding-side device and the decoding-side device may determine the size of the space occupied by bitstreams that the current bitstream buffer has stored, and determine a space size, which is obtained by subtracting the size of the space occupied by the currently stored bitstreams from the storage space allowed for buffering the encoded bitstreams in the current bitstream buffer, as a remaining space of the storage space.

Therefore, the maximum code length is the maximum length of a bitstream currently allowed to be buffered in the storage space used by the encoding-side device for buffering the encoded bitstreams. The maximum code length is a sum of a length of the bitstream that can be accommodated in the remaining space of the storage space and a length of the bitstream outputted from the storage space per unit time.

In some examples, the encoding-side device may control the set overflow line of the bitstream buffer, so that the size of the space allowed for storing the encoded bitstreams is less than or equal to a size of the total storage space of the bitstream buffer. Therefore, the encoding-side device may determine a code length range according to the current set overflow line of the bitstream buffer.

It is to be noted that, during the image encoding process, the encoding-side device may lower the set overflow line of the bitstream buffer to a half, one third or other possible sizes of the total storage space of the bitstream buffer. For example, for a slice, in order to output the encoded bitstream of the slice from the bitstream buffer as quickly as possible after the encoding-side device completes the encoding of the slice, the size of the actual space allowed to accommodate the encoded bitstreams in the bitstream buffer may be reduced, thereby reducing the bitstream of the slice stored in the bitstream buffer after the encoding-side device completes the encoding of the slice. In addition, when the set overflow line is lowered, there may be a case where the space occupied by the bitstreams stored in the current bitstream buffer exceeds the set overflow line. In this case, the encoding-side device may determine a fixed to-be-encoded code length by taking the size of the space occupied by a portion exceeding the set overflow line as a determining factor.

At S102, the encoding-side device pre-encodes the to-be-encoded block to obtain a first code length of the to-be-encoded block.

The first code length is a length of the bitstream obtained after encoding the to-be-encoded block.

In addition, the encoding-side device may pre-encode the to-be-encoded block in an original value mode (also called a sample mode).

The original value mode is a mode of directly encoding the original values of the image block corresponding to the to-be-encoded block.

In one or more examples, the encoding-side device may encode the quantized and transformed values of the original pixel values of the to-be-encoded block in the original value mode. In this way, the encoding-side device may improve the effect of reconstructing the image of the to-be-encoded block by encoding the to-be-encoded block in the original value mode.

In a near-lossless compression encoding scheme, the encoding-side device may encode the to-be-encoded image in the original value mode. The near-lossless compression refers to a compression technology between a lossless compression and a lossy compression. The purpose of the near-lossless compression is to obtain higher image compression quality under a certain compression ratio.

In one or more examples, the encoding-side device may pre-encode the to-be-encoded block in a prediction mode preset by the encoding-side device, such as a point-by-point prediction mode, an intra-frame prediction mode, and a block copy mode.

The intra-frame prediction mode is a prediction mode in which the reconstructed values of pixels in one or more neighboring blocks around the to-be-encoded block are taken as the prediction values. The block copy prediction mode is a prediction mode in which the reconstructed values of pixels of one or more encoded (decoded) blocks that are around (but not necessarily adjacent to) the to-be-encoded block are taken as the prediction values. During the reconstruction, the point-by-point prediction mode refers to a prediction mode in which the reconstructed values of one or more neighboring pixels around a pixel to be predicted are taken as the prediction values of the pixel to be predicted.

The point-by-point prediction mode may include a combination of one or more prediction modes such as a vertical prediction, a horizontal prediction, a vertical mean prediction and a horizontal mean prediction.

The vertical prediction takes the reconstructed value of a pixel on the upper side of the pixel to be predicted (which may be an adjacent upper side or a non-adjacent but near upper side) to obtain the prediction value (PointPredData) of the pixel to be predicted. The horizontal prediction takes the reconstructed value of a pixel on the left side of the pixel to be predicted (which may be an adjacent left side or a non-adjacent but near left side) to obtain the prediction value of the pixel to be predicted. The vertical mean prediction takes the reconstructed values of the pixels above and below the pixel to be predicted to obtain the prediction value of the pixel to be predicted. The horizontal mean prediction takes the reconstructed values of the pixels on the left and right sides of the pixel to be predicted to obtain the prediction value of the pixel to be predicted.

At S103, the encoding-side device encodes the to-be-encoded block in a fallback mode if the first code length is greater than or equal to the maximum code length.

The code length obtained by encoding the to-be-encoded block in the fallback mode is less than the maximum code length.

The to-be-encoded block is encoded in the fallback mode, which means that the to-be-encoded block is encoded using a fixed code length encoding scheme with a predetermined target code length. The total code length required by encoding the to-be-encoded block is the target code length. The target code length is less than the maximum code length.

It is to be understood that the encoding-side device is not to encodes the to-be-encoded block in the fallback mode if the first code length is less than the maximum code length.

It is to be noted that the storage space of the bitstream buffer has a certain size. If the bitstream data inputted into the bitstream buffer is too large, resulting in the data that is expected to be temporarily stored in the bitstream buffer exceeding the size of its storage space, the bitstream will "overflow". This will cause the data of the part in excess to be lost, so that the image information in the image frame of the to-be-encoded video is lost, and the image frame cannot be completely parsed based on the bitstream data outputted by the bitstream buffer.

Therefore, the encoding-side device is expected to control the target code length within the maximum code length.

In some examples, a codeword for the original value mode and that for the fallback mode are the same. For example, the codewords for the original value mode and the fallback mode are both a first codeword. When the encoding-side device encoding in the fallback mode may adopt the first codeword, the first codeword may indicate the fallback mode or the original value mode.

In some examples, the encoding-side device may select a midpoint prediction fallback mode (MPPF Mode) to predict the to-be-encoded block, and after obtaining the predicted block, encode the to-be-encoded block using the fixed code length encoding scheme to obtain a bitstream of the to-be-encoded block.

In the midpoint prediction fallback mode, the encoding-side device may first partition the to-be-encoded block into multiple image subblocks with 2×2 pixels. For each 2×2 image subblock, a middle value is to be calculated. The way of calculating the middle value is as the following Formula (1).

$$\text{middle} = 1 \ll (\text{bitDepth} - 1) \quad \text{Formula (1)}$$

The bitDepth is a bitdepth of a bitstream transmission channel of a current to-be-encoded subblock, and 1<<means shifting left by one bit.

Furthermore, the encoding-side device may determine a mean value of the to-be-encoded subblock.

In a case that the current subblock cannot obtain its surrounding reconstructed image, the middle value is taken as the mean value.

In another case, the mean value is a mean of reconstruction values of the subblocks with 2×1 pixels in an upper row of the subblock. If the reconstructed values of the subblocks in the upper row with 2×1 pixels cannot be obtained, the mean value of the reconstructed image of the previous reconstructed 2×2 subblock of the subblock is taken.

Furthermore, the encoding-side device may determine a bias value of the subblock. The bias value is used to limit the value of the mean value. The encoding-side device may use the bias value and the middle value to clamp the mean value, so as to limit the mean value to a value range between the bias value and the middle value. Thus, the mean value adjusted by the bias value and the middle value is determined as the prediction values of the current to-be-encoded subblock with 2×2 pixels.

The bias value may be determined according to the following Formula (2).

$$\text{bias} = 1 \ll (mppStepSize[k] - 1) \quad \text{Formula (2)}$$

The mppStepSize indicates a quantization step size of a component of the to-be-encoded block in the quantization process, [k] indicates the [k]-th component of the to-be-encoded block, and 1<<means shifting left by one bit.

Figure 6:
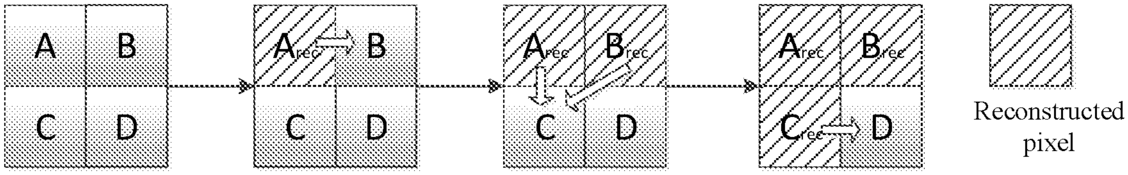
FIG. 6 is a schematic diagram of a to-be-encoded sub-block provided in an example of the present disclosure.

In addition, in the MPPF mode, as illustrated in FIG. 6, the residual values of the subblock with 2×2 pixels may be calculated in the order of the upper left pixel A, the upper right pixel B, the lower left pixel C and the lower right pixel D.

In one or more examples, in the process of reconstructing the to-be-encoded subblock, the reconstructed values of various pixels may be determined sequentially in the order of the upper left pixel A, the upper right pixel B, the lower left pixel C and the lower right pixel D.

In some examples, the encoding-side device may encode the to-be-encoded block using a residual coding scheme.

In one or more examples, the encoding-side device may predict the to-be-encoded block in a prediction mode corresponding to the fallback mode. Alternatively, the encoding-side device may predict the to-be-encoded block in any of the prediction modes preset by the encoding-side device.

The prediction modes preset by the encoding-side device may include a point-by-point prediction mode, an intra-frame prediction mode, a block copy scheme, etc.

In one or more examples, the encoding-side device may determine a fixed one from the prediction modes preset by the encoding-side device as the prediction mode corresponding to the fallback mode. Alternatively, the encoding-side device may select any one of the preset prediction modes as the prediction mode adopted for predicting the current to-be-encoded block in the encoding process.

Therefore, for all to-be-encoded blocks encoded in the fallback mode, the encoding-side device adopts the fixed prediction mode for prediction.

In one or more examples, the fallback mode provided in the example of the present disclosure may include a first fallback mode and a second fallback mode. The first fallback mode means adopting the fixed prediction mode such as a vertical mean prediction mode directly to predict the to-be-encoded block when the fallback mode is adopted to encode the to-be-encoded block. In addition, the second fallback mode has no fixed prediction mode. When the to-be-encoded block is encoded in the second fallback mode, any one of the prediction modes preset by the encoding-side device may be selected for predicting the to-be-encoded block. In addition, the second fallback mode may have no prediction mode. When the to-be-encoded block is encoded in the second fallback mode, the reconstructed values are obtained by directly quantizing and dequantizing the original values.

Therefore, after obtaining the predicted block of the to-be-encoded block, the encoding-side device may perform step 22 to step 25 described above. A residual block of the to-be-encoded block is obtained based on the predicted block and the original pixel values of the to-be-encoded block, and a residual coefficient block is obtained by transforming the residual block. Furthermore, the residual coefficient block is quantized to obtain a quantized residual coefficient block. Finally, the bitstream of the to-be-encoded block is obtained by encoding the quantized residual coefficient block.

In some examples, the encoding-side device may first determine the value of a quantization parameter of the to-be-encoded block, and then perform the quantization processing on the residual values.

In one or more examples, the encoding-side device may derive an initial quantization parameter of the to-be-encoded block according to complexity information of the image block corresponding to the to-be-encoded block and the remaining space of the bitstream buffer. Furthermore, the encoding-side device may determine a target quantization parameter of the to-be-encoded block based on the initial quantization parameter and a quantization parameter adjustment value. The value range of the target quantization parameter is between zero and a preset maximum value of the quantization parameter of the encoding-side device. For example, the target quantization parameter of the to-be-encoded block may be a sum of the initial quantization parameter and the quantization parameter adjustment value.

The larger the remaining capacity of the bitstream buffer is, the larger the quantization parameter adjustment value is. The quantization parameter adjustment value may be a positive integer such as 4 or 8.

Furthermore, the encoding-side device may also determine a fixed code length of each component of the to-be-encoded block.

The to-be-encoded block includes one or more components. The to-be-encoded block may include three components of luminance Y, chrominance Cb, and chrominance Cr (or three components of red R, green G, and blue B, or three components of luminance Y, chrominance U, and chrominance V), or may include only one of the components. If it contains three components, the sizes of the various components may be exactly identical or different, which depends on an image input format.

For example, the to-be-encoded block include only the luminance component if the image format of the to-be-encoded block is YUV400, and the encoding-side device is expected to determine only the fixed code length of the luminance component. Alternatively, the to-be-encoded block include three components of luminance Y, chrominance U and chrominance V if the image format of the to-be-encoded block is YUV420, and the encoding-side device is expected to determine the fixed code length of the luminance component, the fixed code length of the first chrominance component and the fixed code length of the second chrominance component.

In an example, the encoding-side device may obtain a target total code length of the to-be-encoded block and the image format of the to-be-encoded block. The target total code length is a total code length required for encoding all the pixels of the to-be-encoded block and determined based on a target pixel depth (also called bits per pixel (BPP)). The image format of the to-be-encoded block indicates a code length ratio between the chrominance component and the luminance component. Furthermore, the encoding-side device may determine the fixed code length of the luminance component and the fixed code length of the chrominance component of the to-be-encoded block based on the target total code length of the to-be-encoded block and the code length ratio.

The target BPP is determined to indicate a code length required for encoding each pixel of the to-be-encoded block at a target compression ratio. The target BPP may be determined according to the target compression ratio of the to-be-encoded block. The target BPP may also be regarded as an average code length required for encoding each pixel of the to-be-encoded block. The target BPP is obtained by parsing image header information of the bitstream.

The target BPP further indicate the code length required for encoding each pixel of the to-be-encoded block at the target compression ratio. The target BPP may be determined according to the target compression ratio of the to-be-encoded block.

Example 1. If the target BPP of the to-be-encoded block is 8, that is, the target total code length of the to-be-encoded block is (8 bits×the number of pixels of the to-be-encoded block), and the image format is YUV400, the to-be-encoded block includes only one component, i.e., the luminance component, and the total code length of the luminance component may be (8 bits×the number of pixels of the to-be-encoded block), which means that the fixed code length of the luminance component (the code length of one luminance pixel) is 8 bits. The encoding-side device may encode the to-be-encoded block using the fixed code length encoding scheme based on the total code length of the to-be-encoded block determined above. If the to-be-encoded block is a 16×2 image block, the target total code length of the to-be-encoded block is 256 bits.

Example 2. If the current target BPP is 8, that is, the target total code length of the to-be-encoded block is (8 bits×the number of pixels of the to-be-encoded block), and the image format is YUV444, the to-be-encoded block includes three components of luminance Y, chrominance U, and chrominance V. It is to be understood that in this case, the target total code length cannot be evenly distributed to the three components of luminance Y, chrominance U and chrominance V. When the image format is YUV444, the code length ratio of the Y component, the U component and the V component may be 2:1:1. Therefore, the encoding-side device may determine that the total code length of the Y component is (4 bits×the number of pixels of the to-be-encoded block), and both the total code length of the U component and the total code length of the V component are (2 bits×the number of pixels of the to-be-encoded block). Therefore, the encoding-side device may encode the Y component of the to-be-encoded block using the fixed code length encoding scheme based on the code length of (4 bits×the number of pixels of the to-be-encoded block). And, the encoding-side device may encode the U component and the V component of the to-be-encoded block using the fixed code length encoding scheme based on the code length of (2 bits×the number of pixels of the to-be-encoded block).

In addition, since the image format is YUV444, the number of pixels on chrominance either U or V component is the same as the number of pixels on the luminance (Y) component. Therefore, the encoding-side device may take 4 bits (that is, the fixed code length of the luminance is 4 bits) as the fixed code length to encode each pixel of the luminance Y component. Furthermore, the encoding-side device may take 2 bits (that is, the fixed code length of the chrominance is 2 bits) as the fixed code length to encode each pixel of the chrominance U or V component.

Example 3. If the current target BPP is 8, that is, the target total code length of the to-be-encoded block is (8 bits×the number of pixels of the to-be-encoded block), and the image format is YUV422, the to-be-encoded block includes three components of luminance Y, chrominance U and chrominance V. It is to be understood that in this case, (8 bits×the number of pixels of the to-be-encoded block) cannot be evenly distributed to the three components of luminance Y, chrominance U and chrominance V. When the image format is YUV422, and the code length ratio of the Y component, the U component and the V component may be 2:1:1.

Therefore, the encoding-side device may determine that the total code length of the Y component is (4 bits×the number of pixels of the to-be-encoded block), and both the total code length of the U component and the total code length of the V component are (2 bits×the number of pixels of the to-be-encoded block). Therefore, the encoding-side device may encode the Y component of the to-be-encoded block according to the code length of 4 bits×the number of pixels of the to-be-encoded block, that is, encoding the Y component of the to-be-encoded block using a fixed-length code with the fixed code length of 4. And, the encoding-side device may encode the U component and the V component according to the code length of (2 bits×the number of pixels of the to-be-encoded block), for example, 2 bits×16×2, i.e., 64 bits, and using the encoding scheme with the fixed code length of (64/the number of pixels of the to-be-encoded block).

In addition, since the image format is YUV422, the number of pixels on chrominance either U or V component is a half of the number of pixels on the luminance Y component. Therefore, the encoding-side device may take 4 bits (that is, the fixed code length of the luminance component is 4 bits) as the fixed code length to encode each pixel of the luminance Y component. Furthermore, the encoding-side device may also take 4 bits (that is, the fixed code length of the chrominance component is 4 bits) as the fixed code length to encode each pixel of the chrominance U or V component.

In another example, the encoding-side device may acquire the target BPP of the to-be-encoded block, the image format of the to-be-encoded block, and the code length required for encoding the header information of the to-be-encoded block. Furthermore, the encoding-side device may determine the fixed code length of the chrominance component and the fixed code length of the luminance component of the to-be-encoded block based on the target BPP of the to-be-encoded block, the image format of the to-be-encoded block, and the code length required for encoding the header information of the to-be-encoded block.

For an encoded bitstream of each image block, the header information is data with a certain length at the front end of the bitstream. The data may indicate one or more image parameters of the current image block. For example, the one or more image parameters include one or more of the bitdepth, the target BPP, the quantization parameter, and a texture complexity of the current image block.

As an example, if the current target BPP is 8, that is, the target total code length of the to-be-encoded block is (8 bits×the number of pixels of the to-be-encoded block), the code length required for encoding the header information is (2 bits×the number of pixels of the to-be-encoded block). If the image format is YUV400, the to-be-encoded block includes only one component, i.e., the luminance component, and the total code length of the luminance component may be (6 bits×the number of pixels of the to-be-encoded block). Therefore, the fixed code length of the luminance component is 6 bits as the upper limit. In an example, the encoding-side device may encode the to-be-encoded block using the fixed code length encoding scheme based on a code length of (4 bits×the number of pixels of the to-be-encoded block), for example, 4 bits×16×2, i.e., 128 bits.

It is to be noted that in the image encoding and decoding process, since the human eye is more sensitive to image luminance, the code length is usually allocated to the luminance Y component of the image block first, so that the sum of the fixed code lengths of all pixels on the luminance component is greater than or equal to the sum of the fixed code lengths of all pixels on the one or more chrominance components. Therefore, through the image encoding and decoding process, the image effect viewed by the naked eye can be improved.

In another example, the encoding-side device may acquire the target BPP of the to-be-encoded block, the image format of the to-be-encoded block, and the code length required for encoding the header information of the to-be-encoded block. Furthermore, the encoding-side device may determine the fixed code length of the chrominance component and the fixed code length of the luminance component of the to-be-encoded block based on a remaining capability of the bitstream buffer, the target BPP of the to-be-encoded block, the code length ratio, and the code length required for encoding the header information of the to-be-encoded block.

In one or more examples, the sum of the code lengths of all components of the to-be-encoded block is the target code length of the to-be-encoded block minus the code length of the header information of the to-be-encoded block and an exceeded code length of the bitstream buffer.

The target code length is the code length of the to-be-encoded block determined based on the target BPP. The change value of a set overflow line is less than the difference between the fixed code length of the to-be-encoded block and the code length of the header information of the to-be-encoded block. The exceeded code length of the bitstream buffer is a code length of a stored code length of the bitstream buffer exceeding the current set overflow line.

As an example, if the target BPP is 8, the target code length of the to-be-encoded block is (8 bits×the number of pixels of the to-be-encoded block). If the header information needs to occupy (2 bits×the number of pixels of the to-be-encoded block) and in this case, the state of the bitstream buffer is greater than the current set overflow line, the code length occupied by the part greater than the set overflow line is overflow_bpp. In this case, the sum of the code lengths of all components of the to-be-encoded block is the target total code length of the to-be-encoded block (i.e., 8 bits×the number of pixels of the to-be-encoded block) minus the code length occupied for encoding the header information (e.g., 2 bits×the number of pixels of the to-be-encoded block) and then minus overflow_bpp (e.g., 1 bit×the number of pixels of the to-be-encoded block). Therefore, in this case, the sum of the code lengths of all components of the to-be-encoded block is 5 bits×the number of pixels of the to-be-encoded block. Furthermore, the encoding-side device may determine the fixed code length of the chrominance component and the fixed code length of the luminance component of the to-be-encoded block based on the image format of the to-be-encoded block and 5 bits×the number of pixels of the to-be-encoded block.

In some examples, if the set overflow line is expected to be adjusted, the size of the set overflow line satisfies the following Formula (3):

$$\text{delta\_bit} <= (\text{target\_bpp} - \text{cu\_header\_bpp}) \times \text{block\_size} \quad \text{Formula (3)}$$

Where, delta_bit=overflow_bppxblock_size, where the block_size is the size of the to-be-encoded block. The target_bpp represents the target BPP. The cu_header_bpp represents the code length used for encoding the header information of the to-be-encoded block, and the cu_header_bpp is less than or equal to the target_bpp. In addition, the overflow_bpp indicates the code length that the stored code length of the bitstream buffer exceeds the current set overflow line.

In some examples, if the to-be-encoded block includes multiple components and the multiple components of the to-be-encoded block share the fallback mode (which means that all or none of the multiple components adopt the fallback mode), the encoding-side device may only determine whether one of the components adopts the fallback mode. When one of the components adopts the fallback mode, the other components also adopt the fallback mode. Alternatively, if some of the multiple components of the to-be-encoded block share the fallback mode, the encoding-side device may only determine whether one of the some components adopts the fallback mode, and whether one or more components other than the some components adopt the fallback mode. Alternatively, each of the multiple components of the to-be-encoded block does not share the fallback mode, and therefore, the encoding-side device may determine whether each component adopts the fallback mode individually.

In some examples, if the current to-be-encoded block is encoded in the fallback mode, current bitrate control parameters are not updated, that is, the bitrate control parameters corresponding to the previous encoded block of the to-be-encoded block are determined as the bitrate control parameters of the to-be-encoded block. The bitrate control parameters are used to derive encoding information of the next to-be-encoded block, such as a quantization step size.

It is to be noted that for the image block corresponding to each to-be-encoded block during the encoding and decoding process, after the encoding of the current image block is completed, a bitrate controller in the encoding-side device and a bitrate controller in the decoding-side device may update the bitrate control parameters based on the information such as the complexity of the current image block and the code length required for the encoding. The updated bitrate control parameters are used to derive information of the next to-be-encoded image block, such as the quantization step size. However, if the image block is encoded in the fallback mode, the code length required for the encoding cannot correctly reflect the current image content since the code length of the to-be-encoded block is fixed. Therefore, the bitrate control parameters are not updated if the fallback mode is selected for the current image block.

In one or more examples, for the to-be-encoded block having multiple components, the current bitrate control parameters are not updated if one of the components of the current to-be-encoded block is encoded in the fallback mode.

The image encoding method provided in the example of the present disclosure has at least the following beneficial effects. According to the method, the to-be-encoded block may be pre-encoded first, the length of the bitstream obtained through the pre-encoding is compared with the code length allowed to be occupied by the to-be-encoded block, and it is determined whether a bitstream overflow or underflow will occur based on the comparison result. Furthermore, when determining that the bitstream overflow or underflow occurs, it is to encode the to-be-encoded block in the fallback mode, so as to avoid the loss of image information of the to-be-encoded block.

Figure 7:
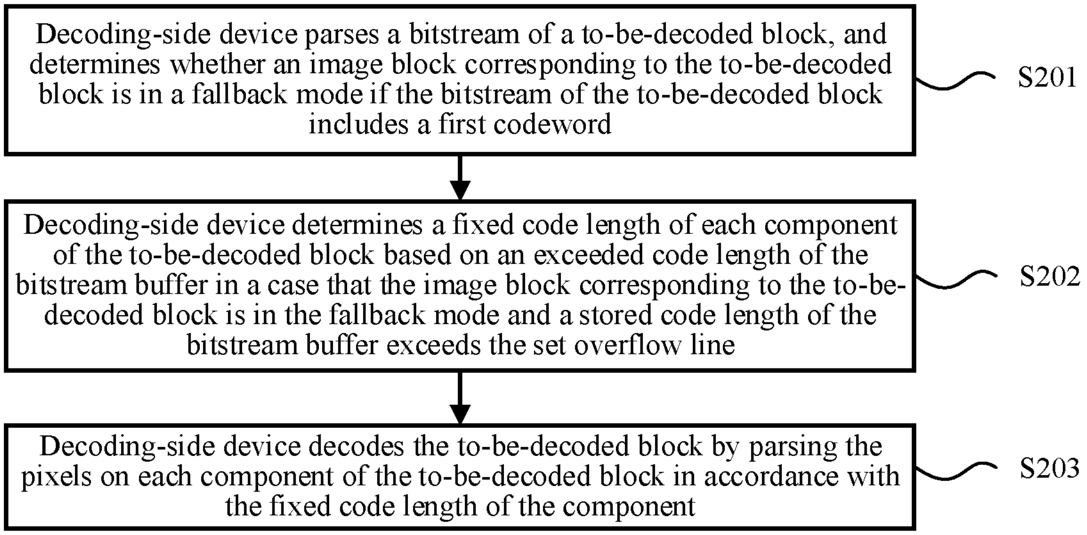
FIG. 7 is a schematic flowchart of an image decoding method provided in an example of the present disclosure.

In some examples, the present disclosure further provides an image decoding method, which corresponds to the encoding method illustrated in FIG. 5. As illustrated in FIG. 7, FIG. 7 is a schematic flowchart of an image decoding method provided in the present disclosure. The image decoding method may be performed by a decoder 200, or by a decoding-side device supporting the function of the decoder 200 (e.g., the decoding-side device 20 illustrated in FIG. 1). By taking an example that the decoding-side device implements the decoding method for description, the image decoding method includes the following steps.

At S201, the decoding-side device parses a bitstream of a to-be-decoded block, and determines whether an image block corresponding to the to-be-decoded block is in a fallback mode if the bitstream of the to-be-decoded block includes a first codeword.

The first codeword refers to a codeword indicating an encoding scheme in the bitstream of the to-be-decoded block. The first codeword indicate the fallback mode or an original value mode.

In some examples, according to whether a code length overflows when the to-be-decoded block is decoded in the original value mode, the decoding-side device may determine whether the image block corresponding to the to-be-decoded block adopts the fallback mode.

In one or more examples, if the code length when the image block corresponding to the to-be-decoded block is encoded in the original value mode is greater than or equal to a maximum code length of the to-be-decoded block, the decoding-side device may determine that the image block corresponding to the to-be-decoded block adopts the fallback mode.

The bitstream of the to-be-decoded block may be a bitstream received by the decoding-side device from an encoding-side device, or from another device such as a storage device, which is not limited in the example of the present disclosure.

The code length of the to-be-decoded block is less than the maximum code length of the to-be-decoded block. The maximum code length is a maximum length of the bitstream of the to-be-decoded block allowed to be buffered and is determined based on a set overflow line of a bitstream buffer.

The set overflow line indicates a maximum storage space allowed to be occupied by bitstreams in the bitstream buffer.

It is to be noted that the maximum code length of the bitstream allowed to be buffered in the bitstream buffer is the maximum length of the bitstream allowed to be buffered in the bitstream buffer when the encoding-side device encodes the to-be-decoded block. The decoding-side device may directly determine the maximum code length by parsing the bitstream of the to-be-decoded block. Alternatively, the decoding-side device may parse the bitstream of the to-be-decoded block, determine the remaining memory state of the bitstream buffer when the encoding-side device encodes the image block corresponding to the to-be-decoded block, and then determine the maximum code length based on the remaining memory state of the bitstream buffer.

The related explanations of the maximum code length may refer to the descriptions related to the step S101, which is not repeated here.

In some examples, the codeword for the original value mode and that for the fallback mode are the same. For example, if the codewords for the original value mode and the fallback mode are both the first codeword, the decoding-side device may determine that the to-be-decoded block adopts the fallback mode or the original value mode when the decoding-side device obtains the first codeword by parsing the bitstream of the to-be-decoded block.

Furthermore, the decoding-side device may determine whether the to-be-decoded block adopts the fallback mode based on the size of the occupied memory space of the bitstream buffer.

When the decoding-side device determines that the occupied memory space of the bitstream buffer during encoding the to-be-decoded image block is greater than a first preset memory value, which means that the overflow is to occur, the decoding-side device determines that the image block corresponding to the to-be-decoded block adopts the fallback mode. Otherwise, the decoding-side device determines that the image block corresponding to the to-be-decoded block adopts the original value mode.

The size of the first preset memory value may be determined according to the actual memory size of the bitstream buffer, and is not specifically limited.

In one or more examples, the decoding-side device determines that the length of the bitstream of the to-be-decoded block is a sum of an image bitwidth of all components multiplied by the number of pixels. Therefore, the decoding-side device may parse the bitstream of the to-be-decoded block and reconstruct the image block of the to-be-decoded block in the original value mode.

In some examples, the to-be-decoded block may include one or more components.

In one or more examples, the to-be-decoded block may include only a luminance component. Alternatively, the to-be-decoded block may include three components, such as three components of luminance Y, chrominance Cb, and chrominance Cr (or three components of red R, green G, and blue B, or three components of luminance Y, chrominance U, and chrominance V). Alternatively, on the basis of the three components, the to-be-decoded block may further include an $\alpha$ component. That is, the to-be-decoded block includes four components in total. The $\alpha$ component is a pixel transparency component. When the value of the $\alpha$ component is 0, the pixels corresponding to the to-be-decoded block is transparent. The image bitwidth of the $\alpha$ component is different from that of the other three components.

In some examples, if the to-be-decoded block includes multiple components and the multiple components of the to-be-decoded block share the fallback mode (which means that all or none of the multiple components adopt the fallback mode), the decoding-side device may only determine whether one of the components adopts the fallback mode. When one of the components adopts the fallback mode, the other components also adopt the fallback mode. Alternatively, if some of the multiple components of the to-be-decoded block share the fallback mode, the encoding-side device may only determine whether one of the some components adopts the fallback mode, and whether one or more components rather than the some components adopt the fallback mode. Alternatively, each of the multiple components of the to-be-decoded block does not share the fallback mode, and therefore, the decoding-side device may determine whether each component adopts the fallback mode individually.

Specifically, the bitstream of the to-be-decoded block may include a flag for indicating the situation of sharing the fallback mode. Thus, the decoding-side device may determine one or more components that share the fallback mode according to the flag, and further determine each component adopting the fallback mode or not.

At S202, the decoding-side device determines a fixed code length of each component of the to-be-decoded block based on an exceeded code length of the bitstream buffer in a case that the image block corresponding to the to-be-decoded block is in the fallback mode and a stored code length of the bitstream buffer exceeds the set overflow line.

The to-be-decoded block includes one or more components. For a first component of the to-be-decoded block, the fixed code length of the first component indicates a code length required for parsing a single pixel of the first component. The exceeded code length of the bitstream buffer is a code length that the stored code length of the bitstream buffer exceeds the current set overflow line.

In some examples, the decoding-side device may determine the fixed code length of each component of the to-be-decoded block based on one or more of a target BPP of the to-be-decoded block, an image format of the to-be-decoded block, a code length of header information of the to-be-decoded block, and a remaining memory of the bitstream buffer for encoding the to-be-decoded image block.

The target BPP further indicate the code length required for decoding each pixel of the to-be-decoded block at a target compression ratio. The target BPP may be determined according to the target compression ratio of the to-be-decoded block. It may mean that the target BPP is an average code length required for decoding various pixels of the to-be-decoded block. In addition, the image format of the to-be-decoded block may further indicate a code length ratio between the chrominance component and the luminance component. For example, if the image format is YUV444, the code length ratio of the Y component, the U component and the V component of the to-be-decoded image block may be 2:1:1.

In one or more examples, the decoding-side device may parse the bitstream of the to-be-decoded block to obtain the BPP of each component of the to-be-decoded block. Alternatively, the decoding-side device may determine the BPP of each component of the to-be-decoded block in the following possible implementations. It is to be understood that the manners in which the decoding-side device determines the fixed code length of each component of the to-be-decoded block are the same as the manners in which the encoding-side device determines the fixed code length of each component for encoding the bitstream of the image block corresponding to the to-be-decoded block.

In one implementation, the decoding-side device may acquire the target BPP of the to-be-decoded block and the image format of the to-be-decoded block, and determine the fixed code length of the chrominance component and the fixed code length of the luminance component of the to-be-decoded block based on the target BPP of the to-be-decoded block and the code length ratio.

It is to be noted that the manners in which the decoding-side device determines the fixed code length of each component corresponds to that of the encoding-side device. If the encoding-side device determines the fixed code length of each component of one image block based on the target BPP of the image block and the image format of the image block, the decoding-side device determines the fixed code length of each component of the image block based on the target BPP of the image block and the image format of the image block accordingly when decoding the encoded bitstream of the image block.

Example 1. If the target BPP of the to-be-decoded block is 8, that is, a target total code length of the to-be-decoded block is 8 bits×the number of pixels of the to-be-decoded block, and the image format is YUV400, the to-be-decoded block includes only one component, i.e., the luminance component, and the total code length of the luminance component may be 8 bits×the number of pixels of the to-be-decoded block, which means that the fixed code length of the luminance component (the code length of one luminance pixel) is 8 bits. The decoding-side device may decode the to-be-decoded block using a fixed code length decoding scheme based on a code length of 8 bits×the number of pixels of the to-be-decoded block. If the to-be-decoded block is a 16×2 image block, the code length of the to-be-decoded block is 256 bits.

Example 2. If the current target BPP is 8, that is, the target code length of the to-be-decoded block is 8 bits×the number of pixels of the to-be-decoded block, and the image format is YUV444, the to-be-decoded block includes three components of luminance Y, chrominance U, and chrominance V. It is to be understood that in this case, 8 bits×the number of pixels of the to-be-decoded block cannot be evenly distributed to the three components of luminance Y, chrominance U and chrominance V. When the image format is YUV444, the code length ratio of the Y component, the U component and the V component may be 2:1:1. Therefore, the decoding-side device may determine that the total code length of the Y component is 4 bits×the number of pixels of the to-be-decoded block, and both the total code length of the U component and the total code length of the V component are 2 bits×the number of pixels of the to-be-decoded block. Therefore, the decoding-side device may decode the Y component of the to-be-decoded block using the fixed code length decoding scheme based on the code length of 4 bits×the number of pixels of the to-be-decoded block. And, the decoding-side device may decode the U component and the V component of the to-be-decoded block using the fixed code length encoding scheme based on the code length of 2 bits×the number of pixels of the to-be-decoded block.

In addition, since the image format is YUV444, the number of pixels on each chrominance U or V component is the same as the number of pixels on the luminance Y component. Therefore, the encoding-side device may take 4 bits (that is, the fixed code length of the luminance component is 4 bits) as the fixed code length to decode each pixel of the luminance Y component. Furthermore, the encoding-side device may take 2 bits (that is, the fixed code length of the chrominance component is 2 bits) as the fixed code length to decode each pixel of the chrominance U or V component.

Example 3. If the current target BPP is 8, that is, the target code length of the to-be-decoded block is 8 bits×the number of pixels of the to-be-decoded block, and the image format is YUV422, the to-be-decoded block includes three components of luminance Y, chrominance U, and chrominance V. It is to be understood that in this case, 8 bits×the number of pixels of the to-be-decoded block cannot be evenly distributed to the three components of luminance Y, chrominance U and chrominance V. When the image format is YUV422, and the code length ratio of the Y component, the U component and the V component may be 2:1:1. Therefore, the decoding-side device may determine that the total code length of the Y component is 4 bits×the number of pixels of the to-be-decoded block, and both the total code length of the U component and the total code length of the V component are 2 bits×the number of pixels of the to-be-decoded block. Therefore, the decoding-side device may decode the Y component of the to-be-decoded block using the fixed code length decoding scheme based on the code length of 4 bits×the number of pixels of the to-be-decoded block. And, the decoding-side device may decode the U component and the V component of the to-be-decoded block using the fixed code length encoding scheme based on the code length of 2 bits×the number of pixels of the to-be-decoded block.

In addition, since the image format is YUV422, the number of pixels on either chrominance U or V component is a half of the number of pixels on the luminance Y component. Therefore, the decoding-side device may take 4 bits (that is, the fixed code length of the luminance component is 4 bits) as the fixed code length to decode each pixel of the luminance Y component. Furthermore, the decoding-side device may take 4 bits (that is, the fixed code length of the chrominance component is 4 bits) as the fixed code length to decode each pixel of the chrominance U or V component.

In another implementation, the decoding-side device may acquire the target BPP of the to-be-decoded block, the image format of the to-be-decoded block, and the code length required for decoding the header information of the to-be-decoded block. Furthermore, the decoding-side device may determine the fixed code length of the chrominance component and the fixed code length of the luminance component of the to-be-decoded block based on the target BPP of the to-be-decoded block, the image format of the to-be-decoded block, and the code length required for decoding the header information of the to-be-decoded block.

As an example, if the current target BPP is 8, the target code length of the to-be-decoded block is 8 bits×the number of pixels of the to-be-decoded block, the code length required for decoding the header information is 2 bits×the number of pixels of the to-be-decoded block, and the image format is YUV400, the to-be-decoded block includes only one component, i.e., the luminance component, and the total code length of the luminance component may be 6 bits×the number of pixels of the to-be-decoded block. Therefore, the fixed code length of the luminance component is 6 bits. The decoding-side device may decode the to-be-decoded block using the fixed code length decoding scheme based on the code length of 6 bits×the number of pixels of the to-be-decoded block. As another example, the decoding-side device may acquire the target BPP of the to-be-decoded block, the image format of the to-be-decoded block, and the code length required for decoding the header information of the to-be-decoded block. Furthermore, the encoding-side device may determine the fixed code length of the chrominance component and the fixed code length of the luminance component of the to-be-decoded block based on a remaining capability of the bitstream buffer, the target BPP of the to-be-decoded block, the code length ratio, and the code length required for decoding the header information of the to-be-decoded block.

In one or more examples, the sum of the code lengths of all components of the to-be-decoded block is the target code length of the to-be-decoded block minus the code length of the header information of the to-be-decoded block and an exceeded code length of the bitstream buffer.

The target code length is the code length of the to-be-decoded block determined based on the target BPP. The change value of the set overflow line is less than or equal to the difference between the fixed code length of the to-be-decoded block and the code length of the header information of the to-be-decoded block. The exceeded code length of the bitstream buffer is a code length of the stored code length of the bitstream buffer exceeding the current set overflow line.

As an example, if the target BPP is 8, the target code length of the to-be-decoded block is 8 bits×the number of pixels of the to-be-decoded block. If the header information needs to occupy 2 bits×the number of pixels of the to-be-decoded block and in this case, the state of the bitstream buffer is greater than the current set overflow line, the code length occupied by the part greater than the set overflow line is overflow_bpp. In this case, the sum of the code lengths of all components of the to-be-decoded block is the target length of the to-be-decoded block (i.e., 8 bits×the number of pixels of the to-be-decoded block) minus the code length occupied for decoding the header information (e.g., 2 bits× the number of pixels of the to-be-decoded block) and then minus overflow_bpp (e.g., 1 bit×the number of pixels of the to-be-decoded block). Therefore, in this case, the sum of the code lengths of all components of the to-be-decoded block is 5 bits×the number of pixels of the to-be-decoded block. Furthermore, the encoding-side device may determine the fixed code length of the chrominance component and the fixed code length of the luminance component of the to-be-decoded block based on the image format of the to-be-decoded block and 5 bits×the number of pixels of the to-be-decoded block.

At S203, the decoding-side device decodes the to-be-decoded block by parsing the pixels on each component of the to-be-decoded block in accordance with the fixed code length of the component.

Figure 8:
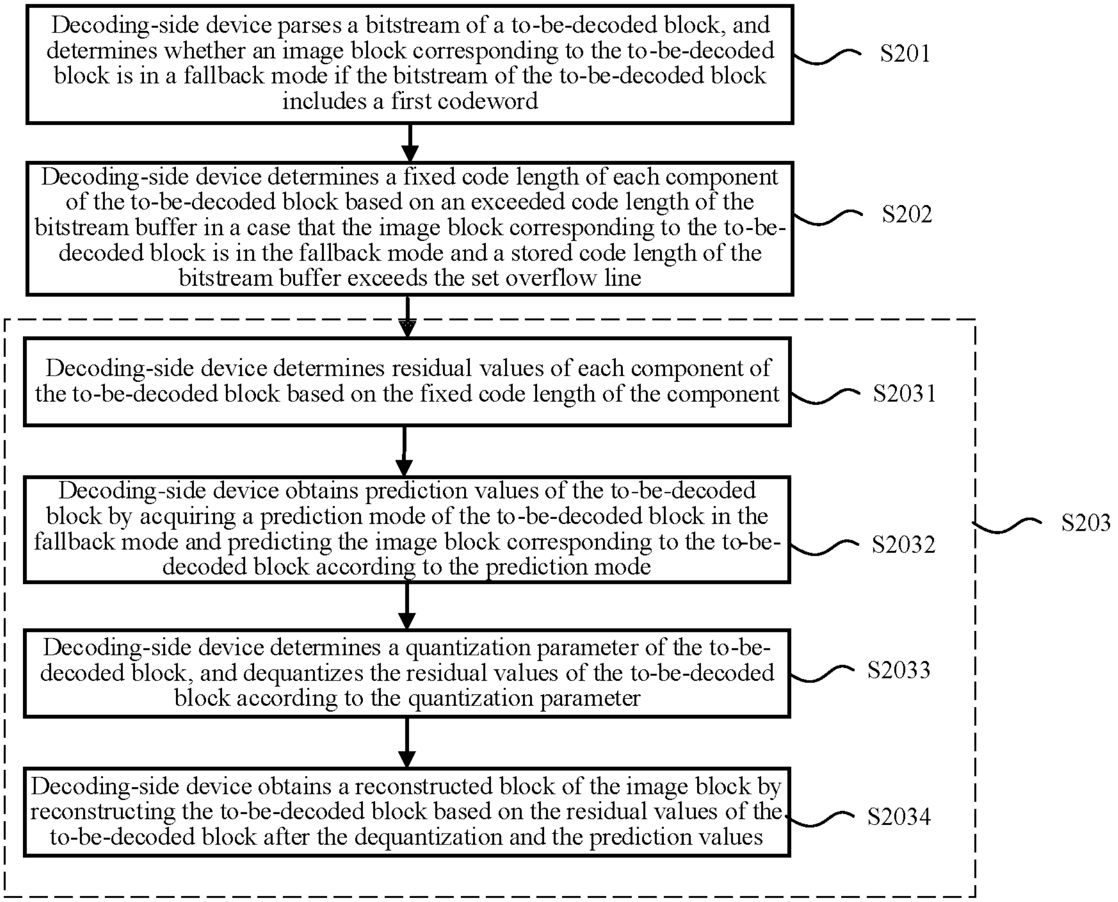
FIG. 8 is a schematic flowchart of another image decoding method provided in an example of the present disclosure.

In some examples, as illustrated in FIG. 8, the step S203 may be specifically implemented by the following steps S2031 to S2034.

At S2031, the decoding-side device determines residual values of each component of the to-be-decoded block based on the fixed code length of the component.

As an example, the decoding-side device may determine the residual value of each pixel on the component of the to-be-decoded block based on the fixed code length of the component of the to-be-decoded block determined in step S202.

At S2032, the decoding-side device obtains prediction values of the to-be-decoded block by acquiring a prediction mode of the to-be-decoded block in the fallback mode and predicting the image block corresponding to the to-be-decoded block according to the prediction mode.

In one or more examples, the decoding-side device may predict the to-be-decoded block using the prediction mode corresponding to the fallback mode, i.e., using the first fallback mode described above. Alternatively, the decoding-side device may predict the to-be-decoded block using any of prediction modes preset by the decoding-side device, that is, using the second fallback mode described above. It is to be understood that the decoding-side device may determine a fixed one from the prediction modes preset by the decoding-side device as the prediction mode corresponding to the fallback mode. Therefore, for all to-be-decoded blocks decoded in the fallback mode, the decoding-side device adopts the fixed prediction mode for prediction.

The prediction modes preset in the decoding-side device are the same as the prediction modes preset in the encoding-side device. The descriptions of the specific prediction modes may refer to the descriptions related to the step S103, which is not repeated here.

In one implementation, when the to-be-decoded block includes one component, the decoding-side device may parse the bitstream of the to-be-decoded block to determine the prediction mode of the to-be-decoded block. Alternatively, the decoding-side device may determine a preset prediction mode as the prediction mode of the to-be-decoded block. It is to be understood that the preset prediction mode is the same as the prediction mode adopted by the encoding-side device in its prediction process.

In another implementation, when the to-be-decoded block includes multiple components, the multiple components of the to-be-decoded block may adopt the same prediction mode, so that the decoding-side device may determine the prediction mode of only one of the components, which is the prediction mode for all components of the to-be-decoded block. Alternatively, some of the multiple components of the to-be-decoded block may adopt the same prediction mode, and the decoding-side device may determine the prediction mode of only one of the some components, and determine the prediction modes of one or more components other than the some components. Alternatively, the decoding-side device may determine the prediction mode of each component individually.

At S2033, the decoding-side device determines a quantization parameter of the to-be-decoded block, and dequantizes the residual values of the to-be-decoded block according to the quantization parameter.

In one or more examples, the decoding-side device may first determine an initial quantization parameter of the to-be-decoded block, and then adjust the initial quantization parameter based on a quantization parameter adjustment value to determine a target quantization parameter of the to-be-decoded block. The target quantization parameter has a value range between zero and a preset maximum value of the quantization parameter of the decoding-side device.

For example, the target quantization parameter of the to-be-decoded block may be a sum of the initial quantization parameter and the quantization parameter adjustment value. It is to be understood that the way in which the decoding-side device determines the target quantization parameter is the same as the way in which the encoding-side device determines the target quantization parameter of the image block.

The larger the remaining capacity of the bitstream buffer is, the larger the quantization parameter adjustment value is. The quantization parameter adjustment value may be a positive integer such as 4 or 8.

The decoding-side device determines the original quantization parameter in at least the following ways.

In one implementation, the header information of the to-be-decoded block includes the quantization parameter for performing a quantization on the image block corresponding to the to-be-decoded block. Therefore, the decoding-side device may parse the header information of the to-be-decoded block and determine the initial quantization parameter of the to-be-decoded block.

In another implementation, the decoding-side device may derive the initial quantization parameter of the to-be-decoded block according to complexity information of the image block corresponding to the to-be-decoded block and the remaining space of the bitstream buffer.

Furthermore, the decoding-side device may determine a quantization step size Qstep based on the value of the QP by at least one of formula derivation or table lookup. Three possible implementation approaches are provided below. Then, for a selected quantizer combination, the Qstep of the to-be-decoded block is taken to perform a dequantization on each pixel of the to-be-decoded block.

Approach 1, Qstep=a×QP+b, where α and b are preset parameters, for example, a is 2 and b is 1.

Approach 2, $Q_{step}=2^T$, where T is an integer related to the QP, for example, T=(QP−6)/4.

Approach 3, $Qstep=2^{(QP+offset)/octave}$, where the octave is an exponent of the QP, that is, the value of Qstep doubles with the value of the QP increased by the octave. The octave is usually selected as 6 or 8, and the offset is an integer offset value.

In one or more examples, a conventional scalar quantization scheme in H.265 described below may be adopted to implement the quantization and the dequantization.

$$\text{Quantization: } l = \text{sign}(c) * \text{floor}\left(\frac{|c|}{Qstep} + f\right).$$

$$\text{Dequantization: } c' = l * Qstep.$$

The l is a horizontal value obtained after the quantization. The c is the residual coefficient to be quantized (which may be the residual coefficient in a transform domain, that is, a transformed residual coefficient; or may be the residual coefficient in a pixel domain, that is, residual values). The Qstep is a quantfication step size. The f is a parameter for controlling rounding, f∈[0,1). The sign represents a sign function. The floor represents a rounding down function. The c' is a value after the dequantization.

It may be understood that the larger the QP value, the larger the Qstep value, which causes the coarser quantization, the greater image distortion due to the quantization, and the smaller bitrate of coefficient encoding.

The [0,1−f) represents a quantization dead zone. The parameter f is related to the length of the quantization dead zone. The smaller the f is, the longer the quantization dead zone is, and the closer the horizontal value after the quantization is to zero. When f=0.5, the above quantization and dequantization formulas are equivalent to rounding, and the quantization distortion is minimal. When f<0.5, the smaller the f is, the greater the quantization distortion is, and the smaller the bitrate of the coefficient encoding is. In H.265, for an intra (I) frame, f=1/3 is selected, and for a bidirectional/predicted (B/P) frame, f=1/6 is selected.

As an example, the quantization or dequantization formula of a uniform quantizer may refer to the above quantization and dequantization formulas. The parameter f may be taken as follows.

Scheme 1, the f is taken to 0.5 or another fixed value.

Scheme 2, the f may be adaptively determined according to the QP value, the prediction mode, and whether to perform a transform.

At S2034, the decoding-side device obtains a reconstructed block of the image block by reconstructing the to-be-decoded block based on the residual values of the to-be-decoded block after the dequantization and the prediction values.

According to the example, when the encoding-side device adopts the fallback mode, the decoding-side device may decode the to-be-decoded block in the fallback mode, which may avoid the bitstream overflow or underflow based on the remaining memory of the bitstream buffer, thereby avoiding the loss of image information of the to-be-decoded block.

In some examples, the image decoding process provided in the present disclosure may be specifically described as follows.

At the first step, it is first determined whether a to-be-decoded block meets Condition 1. If Condition 1 is met, the to-be-decoded block is decoded in a fallback mode.

Condition 1 specifically means that a total code length obtained by encoding all components of the to-be-decoded block in an original value mode exceeds a code length that the bitstream buffer can currently accommodate. The code length that the bitstream buffer can currently accommodate may be determined by subtracting a memory capacity occupied by a code length that the bitstream buffer has currently stored from a memory capacity indicated by a current set overflow line.

That is, if the current bitstream buffer state cannot satisfy encoding all components in the original value mode at the same time, the to-be-decoded block is parsed in the fallback mode, and the original value mode is closed.

In one or more examples, the decoding-side device may first acquire the current stored code length (CurrBits) in the bitstream buffer. Furthermore, the decoding-side device may determine the image size of the to-be-decoded block as, for example, 16 in width (CbWidth) and 2 in height (CbHeight). The code length required for encoding the to-be-decoded block in the original value mode (FallbackFlag=0) s determined. Specifically, the image format (image_format) and the image size (cbChromaSize) of each component of the to-be-decoded block are parsed, and the code length (modeBits) required for encoding each component in the original value mode may be obtained.

Furthermore, the decoding-side device may calculate the total code length required for encoding the to-be-decoded block in the original value mode by (BitDepth[0]×cbLumaSize+BitDepth[1]×cbChromaSize×2-(TargetBpp<<1)). And, it is determined whether the total code length meets Condition 1. If Condition 1 is met, the to-be-decoded block is decoded in the fallback mode. Finally, the decoding-side device may locate the to-be-decoded block (CuPosX[0], CuPosY[0]). Then, it is to parse the next image block.

At the second step, the decoding-side device may parse the complexity and an encoding scheme of the to-be-decoded block.

In one or more examples, the decoding-side device may parse the complexity of a component of the to-be-decoded block with a fixed code length of 1 bit (u(1)) or 3 bits (complexity_level_flag).

Furthermore, the decoding-side device may also parse the encoding scheme of the to-be-decoded block.

The decoding-side device may first determine a prediction mode, and then determine the decoding scheme of the to-be-decoded block according to the prediction mode. If the fallback mode is allowed (allowfallback) and is in the original value mode currently, the prediction mode of the current to-be-decoded block is first assigned with a block prediction mode (IBC_MODE), i.e., the prediction mode corresponding to a first fallback mode. Therefore, the decoding-side device parses the coordinates of a predicted block corresponding to the current to-be-decoded block in a search area (abs_bvd_minus1[blkIdx]) with a fixed code length of 5 bits (u(5)).

At the third step, the decoding-side device derives a code length of a fixed-length code and use the fixed-length code to parse each quantized coefficient value.

In the first fallback mode, the coefficient value represents quantized residual values. In the second fallback mode, there is no prediction mode at this time, and the coefficient value represents quantized original values.

Finally, a dequantization is performed. In the first fallback mode, the reconstructed values are obtained by the prediction values plus the residual values. In the second fallback mode, the dequantized values are taken as the reconstructed values.

The above process may be specifically implemented as the following text descriptions process.

```
  coding__unit__data__substream0 (cuIdxX, cuIdxY) {
  BitsRecord = CurrBits
  CbWidth[0] = 16
  CbHeight[0] = 2
  FallbackFlag = 0
  cbLumaSize = CbWidth[0] × CbHeight[0]
  if (image__format == '001'){   /* YUV400 */
     cbChromaSize = 0
     modeBits = 8
  } else if (image__format == '001') {   /* YUV420 */
     cbChromaSize = cbLumaSize >> 2
     modeBits = 15
  } else if (image__format == '010') {   /* YUV422 */
     cbChromaSize = cbLumaSize >> 1
     modeBits = 15
  } else {
     cbChromaSize = cbLumaSize
     modeBits = 21
  }
  allowfallback = modeBits + (BitDepth[0] × cbLumaSize + BitDepth[1] × cbChromaSize
× 2 − (TargetBpp << 1)) >= MaxBufferSize − (CurrBits − OutBits)
  CuPosX[0] = cuIdxX << 4
  CuPosY[0] = cuIdxY << 1
  CurrBlocks++
  complexity__level__flag[0]
u(1)
  if (ComplexityLevelFlag[0] = 0) {
     delta__level[0]
u(2)
     if (delta__level[0] >= PrevComplexityLevel) {
        ComplexityLevel[0] = DeltaLevel[0] + 1
     } else {
        ComplexityLevel[0] = DeltaLevel[0]
     }
  } else {
     ComplexityLevel[0] = PrevComplexityLevel
  }
  PrevComplexityLevel = ComplexityLevel[0]
  pred__mode[0]
ae(v)
  if (PredMode[0] == ORG__MODE && allowfallback) {
     FallbackFlag=1
u(1)
     fallback__type
     PredMode[0] == FallbackType == 1 'ORG__MODE' : 'IBC__MODE'
  }
  if (PredMode[0] == 'IBC__MODE') {
     for (blkIdx=0; blkIdx<8; blkIdx++) {
     abs__bvd__minus1[blkIdx]
u(5)
     }
  }
  if (PredMode[0] != POINT__MODE__1 && PredMode[0] != POINT__MODE__1 &&
PredMode[0] != ORG__MODE && !LosslessFlag && !FallbackFlag) {
     resi__skip[0]
u(1)
  }
  if (ResiSkip[0] != 1) {
     coeff__data(BitDepth[0], 0)
  }
```

In the above text description, the type of the fallback mode is determined using a binary variable approach. If the value is '1', it means that the fallback mode adopted by the current coding unit is an original value truncation mode. If the value is '0', it means that the fallback mode adopted by the current coding unit is a residual truncation mode. The value of FallbackType is equal to the value of fallback_type.

In some examples, the decoding-side device acquires binary data from the bitstream representing the fixed-length code of the to-be-decoded block, and processes the binary data using a debinarization approach to obtain specific data of the BPP.

The decoding-side device first determines the binary data (org_data) of the fixed-length code.

If the flag value of the fallback mode (FallbackFlag) is equal to 0, which means that the fallback mode is not adopted during the encoding, the value of a bitdepth of the current channel (BitDepth[component]) is taken as the code length of the fixed-length code (len), and the value of the org_data is equal to the value of "synElVal" in Table 1.

Otherwise, the decoding-side device takes the value of the fixed-length code as the code length len, and the value of the org_data is equal to the value of synElVal (by referring to Table 1 below).

The specific derivation of the fixed-length codes is as follows.

1) The decoding-side device first calculates a value of the target BPP after adjusting the overflow line(adjTargetBpp).

If (BitsRecord−((target BPPTargetBpp<<1)×(next to-be-decoded block (CurrBlocks)−1))) is greater than a maximum set overflow line (MaxBufferSize), the adjTargetBpp is equal to (((Target_bpp<<1)−(BitsRecord−((TargetBpp<<1)×(CurrBlocks−1))−MaxBufferSize))<<5).

Otherwise, adjTargetBpp is equal to (Target_bpp>>4). (Target_bpp>>4) refers to the target BPP.

2) The decoding-side device determines the code length of the fixed-length code on each component based on the adjTargetBpp.

If the image format is equal to YUV400, the fixed-length code is equal to (adjTargetBpp-2).

Otherwise, it is determined whether the current component is equal to the luminance component.

If it is equal to the luminance component, the fixed-length code is equal to (adjTargetBpp-2)/3+(adjTargetBpp-2)/3.

Otherwise, if the image format is equal to YUV420, the fixed-length code is equal to (adjTargetBpp-2)/3<<2.

If the image format is equal to YUV422, the fixed-length code is equal to (adjTargetBpp-2)/3<<1.

Otherwise, the fixed-length code is equal to (adjTargetBpp-2)/3.

TABLE 1

| Value of synElVal | Binary symbol string | | | | |
|---|---|---|---|---|---|
| 0 | 0 | 0 | . . . | 0 | 0 |
| 1 | 0 | 0 | . . . | 0 | 1 |
| 2 | 0 | 0 | . . . | 1 | 0 |
| 3 | 0 | 0 | . . . | 1 | 1 |
| . . . | | | . . . | | |
| $2^{len}$-4 | 1 | 1 | . . . | 0 | 0 |
| $2^{len}$-3 | 1 | 1 | . . . | 1 | 0 |
| $2^{len}$-2 | 1 | 1 | . . . | 1 | 0 |
| $2^{len}$-1 | 1 | 1 | . . . | 1 | 1 |
| binIndex | 0 | 1 | . . . | len-2 | len-1 |

The encoding apparatuses and the decoding apparatuses provided in the examples of the present disclosure are described below. The decoding apparatus may be a video encoder or a device including the video encoder. The encoding apparatus includes various modules for implementing the image encoding method according to any possible implementation. The encoding apparatus has functions of implementing the operations in related method examples. The functions may be implemented by hardware, or by corresponding software executed by hardware. The hardware or the software includes one or more modules corresponding to the functions. The beneficial effects thereof may refer to the descriptions of the corresponding methods, which are not repeated here. The decoding apparatus may be a video decoder or a device including the video decoder. The decoding apparatus includes various modules for implementing the image decoding method according to any possible implementation. The decoding apparatus has functions of implementing the operations in related method examples. The functions may be implemented by hardware, or by corresponding software executed by hardware. The hardware or the software includes one or more modules corresponding to the functions. The beneficial effects thereof may refer to the descriptions of the corresponding methods, which are not repeated here.

In an example, any encoding apparatus provided in the examples of the present disclosure may be the encoding-side device 10 or the encoder 100 in FIG. 1. In another example, any decoding apparatus provided below may be the decoding-side device 20 or the decoder 200 in FIG. 1. These are explained uniformly here and are not repeated below.

Figure 9:
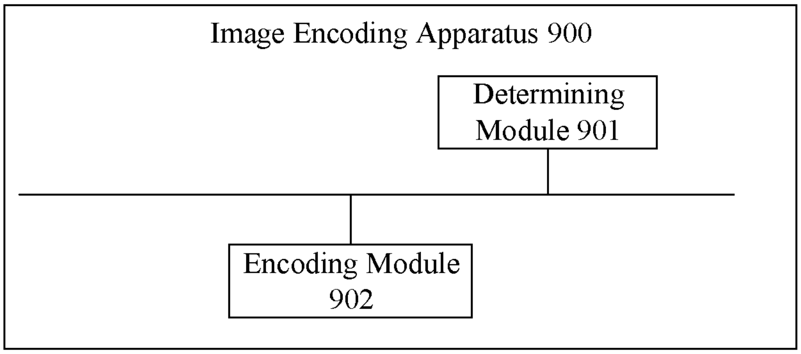
FIG. 9 is a schematic structural diagram of an image encoding apparatus 900 provided in an example of the present disclosure.

FIG. 9 is a schematic structural diagram of an image encoding apparatus 900 provided in the present disclosure. Any of the forgoing encoding method examples may be performed by the encoding apparatus 900. The image encoding apparatus 900 includes a determining module 901 and an encoding module 902. The determining module 901 is configured to acquire a maximum code length of a to-be-encoded block. The maximum code length is a maximum length of a bitstream of the to-be-encoded block allowed to be buffered in a bitstream buffer and is determined based on a set overflow line of the bitstream buffer. The set overflow line indicates a maximum storage space allowed to be occupied by bitstreams in the bitstream buffer. The encoding module 902 is configured to obtain a first code length of the to-be-encoded block by pre-encoding the to-be-encoded block. The first code length is a length of a bitstream obtained after encoding the to-be-encoded block. The encoding module 902 is further configured to encode the to-be-encoded block in a fallback mode in a case that the first code length is greater than or equal to the maximum code length. A code length obtained by encoding the to-be-encoded block in the fallback mode is less than the maximum code length. A bitstream obtained by encoding the to-be-encoded block in the fallback mode includes a first codeword. The first codeword indicates the fallback mode or an original value mode.

For the determining module 901 and the encoding module 902, as well as the technical features therein and the beneficial effects, etc., more detailed description thereof may refer to the corresponding parts of the method examples, which are not be repeated here.

Figure 10:
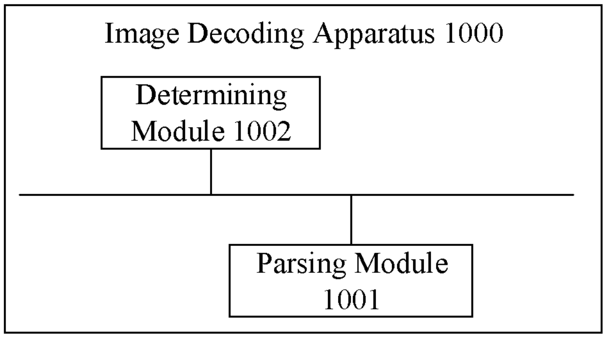
FIG. 10 is a schematic structural diagram of another image decoding apparatus 1000 provided in an example of the present disclosure.

FIG. 10 is a schematic structural diagram of an image decoding apparatus 1000 provided in the present disclosure. Any of the foregoing decoding method examples may be performed by the decoding apparatus 1000. The image decoding apparatus 1000 includes a parsing module 1001 and a determining module 1002. The parsing module 1001 is configured to parse a bitstream of a to-be-decoded block, and determine whether an image block corresponding to the to-be-decoded block is in a fallback mode in a case that the bitstream of the to-be-decoded block includes a first codeword. A code length of the to-be-decoded block is less than a maximum code length of the to-be-decoded block. The maximum code length is a maximum length of the bitstream of the to-be-encoded block allowed to be buffered in a bitstream buffer and is determined based on a set overflow line of the bitstream buffer. The set overflow line indicates a maximum storage space allowed to be occupied by bitstreams in the bitstream buffer. The first codeword indicates the fallback mode or an original value mode. The determining module 1002 is configured to determine a fixed code length of each component of the to-be-decoded block based on an exceeded code length of the bitstream buffer in a case that the image block corresponding to the to-be-decoded block is in the fallback mode and a stored code length of the bitstream buffer exceeds the set overflow line. The to-be-decoded block includes one or more components. For a first component of the to-be-decoded block, the fixed code length of the first component indicates a code length required for parsing a single pixel of the first component. The exceeded code length of the bitstream buffer is a code length that the stored code length of the bitstream buffer exceeds the set overflow line. The parsing module 1001 is further configured to decode the to-be-decoded block by parsing the pixels on each component in accordance with the fixed code length of the component.

For the parsing module 1001 and the determining module 1002, as well as the technical features therein and the beneficial effects, etc., more detailed description thereof may refer to the corresponding parts of the method examples, which are not be repeated here.

Figure 11:
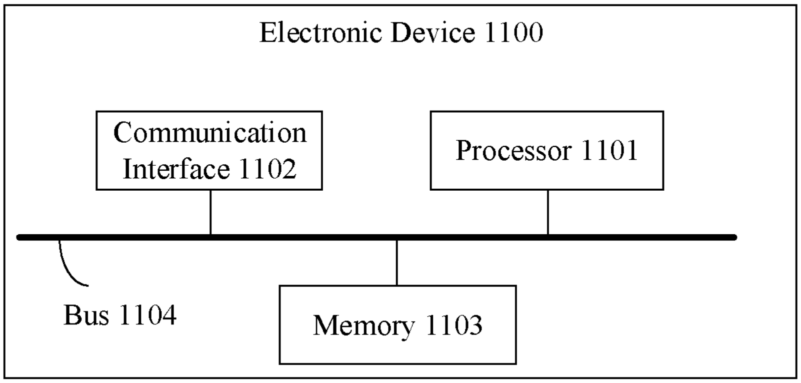
FIG. 11 is a schematic structural diagram of an electronic device 1100 provided in an example of the present disclosure.

The present disclosure further provides an electronic device. The electronic device including one or more processors and one or more memories. The one or more memories are configured to store computer instructions, and the one or more processor are configured to call from the one or more memories and execute the computer instructions to perform any of the foregoing image encoding/decoding method examples. As an example, the electronic device may refer to a video encoder, or a device including the video encoder. As another example, the electronic device may refer to a video decoder, or a device including the video decoder. As illustrated in FIG. 11, it is a schematic structural diagram of an electronic device provided in the present disclosure. The electronic device 1100 includes a processor 1101 and a communication interface 1102. The processor 1101 and the communication interface 1102 are coupled to each other. It is to be understood that the communication interface 1102 may be a transceiver or an input-output interface.

In an example, the electronic device 1100 may further include a memory 1103 for storing instructions executed by the processor 1101, storing input data required for the processor 1101 to execute the instructions, or storing data generated after the processor 1101 executes the instructions.

Specific connection medium between the communication interface 1102, the processor 1101, and the memory 1103 is not limited in the example of the present disclosure. In FIG. 11, the example of the present disclosure connect the communication interface 1102, the processor 1101, and the memory 1103 via a bus 1104, which is represented by a thick line in FIG. 11 and is only a schematic illustration and is not intended to limit other connection ways between the components. The bus may be divided into an address bus, a data bus, a control bus, and so on. For ease of representation, only a thick line is illustrated in FIG. 11, but it does not mean that there is only one bus or one type of bus.

The memory 1103 may be configured to store software programs and modules, such as program instructions/modules corresponding to the image decoding methods or image encoding methods provided in the examples of the present disclosure. The processor 1101 perform various functional applications and data processing by executing the software programs and modules stored in the memory 1103, so as to implement any image decoding method or image encoding method provided above. The communication interface 1102 may be configure to perform signaling or data communications with other devices. In the present disclosure, the electronic device 1100 may have multiple communication interfaces 1102.

It is to be understood that the processor in the example of the present disclosure may be a central processing unit (CPU), a neural processing unit (NPU) or a graphic processing unit (GPU), or may be other such as a general-purpose processor, a digital signal processor (DSP), an application specific integrated circuit (ASIC), a field programmable gate array (FPGA) or another programmable logic device, a transistor logic device, a hardware component or any combination thereof. The general-purpose processor may be a microprocessor or any conventional processor.

The method steps in the examples of the present disclosure may be implemented by hardware or by a processor executing software instructions. The software instructions may be composed of corresponding software modules. The software modules may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a mobile hard disk, a CD-ROM or a storage medium of any other form known in the art. The present disclosure provides a non-transitory computer-readable storage medium, in which one or more computer programs or instructions are stored. The computer programs or instructions, when executed by a computing device or a storage system where the computing device is located, implement the image encoding method or the image decoding method according to any implementation. A storage medium, as an example, is coupled to the processor such that the processor can read information from, and write information to, the storage medium. Of course, the storage medium may also be a component of the processor. The processor and the storage medium may reside in an ASIC. Additionally, the ASIC may reside in a network device or a terminal device. Of course, the processor and the storage medium may also exist as discrete components in the network device or the terminal device.

The present disclosure provides a computer program product, which includes instructions. The computer program product, when running on a computing device or a processor, enables the computing device or the processor to execute the instructions to implement the image encoding method or the image decoding method according to any implementation.

The present disclosure provides a chip including a processor and a memory. The memory is configured to store computer instructions, and the processor is configured to call from the memory and execute the computer instructions to implement the image encoding method or the image decoding method according to any implementation.

An example of the present disclosure also provides an encoding and decoding system (also called an image transcoding system), including an encoding-side device and a decoding-side device. The encoding-side device may be configured to perform any one of the image encoding methods provided above, and the decoding-side device is configured to perform the corresponding image decoding methods.

The foregoing examples may be implemented in whole or in part by software, hardware, firmware, or any combination thereof. When implemented by software, it may be implemented in whole or in part in the form of a computer program product. The computer program product includes one or more computer programs or instructions. When the computer programs or instructions are loaded and executed on a computer, the processes or functions according to the examples of the present disclosure are performed in whole or in part. The computer may be a general-purpose computer, a dedicated computer, a computer network, a network device, a user device or another programmable device. The computer programs or instructions may be stored in a computer-readable storage medium or transmitted from one computer-readable storage medium to another computer-readable storage medium. For example, the computer programs or instructions may be transmitted from a website site, a computer, a server or a data center to another website site, another computer, another server, or another data center in a wire or wireless way. The computer-readable storage medium may be any available medium that can be accessed by a computer or a data storage device such as a server and a data center that integrates one or more available media. The available medium may be a magnetic medium, e.g., a floppy disk, a hard disk, and a magnetic tape, may be an optical medium, e.g., a digital video disc (DVD), or may be a semiconductor medium, e.g., a solid state disk (SSD).

In the various examples of the present disclosure, the terms and/or descriptions in different examples are consistent and may be referenced to each other, unless otherwise specified or in any logical conflict. The technical features in the different examples may be combined to form new examples according to their inherent logical relationships.

It is to be understood that the various numerical numbers involved in the examples of the present disclosure are divisions only for the convenience of descriptions and are not used to limit the scopes of the examples of the present disclosure. The values of the serial numbers in the above processes do not mean an operation order. The operation order in the various processes should be determined by their functions and internal logics.

The invention claimed is:

1. An image decoding method, applied to a decoding-side device, the method comprising:

parsing a bitstream of a to-be-decoded block, and determining whether an image block corresponding to the to-be-decoded block is in a fallback mode in a case that the bitstream of the to-be-decoded block comprises a first codeword, wherein a code length of the to-be-decoded block is less than a maximum code length of the to-be-decoded block, the maximum code length is determined based on a set overflow line of a bitstream buffer, and the set overflow line indicates a maximum storage space allowed to be occupied by bitstreams in the bitstream buffer, and wherein the first codeword indicates the fallback mode or a sample mode;

determining a fixed code length of each component of the to-be-decoded block based on an exceeded code length of the bitstream buffer in a case that the image block corresponding to the to-be-decoded block is in the fallback mode and a stored code length of the bitstream buffer exceeds the set overflow line, wherein the to-be-decoded block comprises one or more components, and for a first component of the to-be-decoded block, the fixed code length of the first component indicates a code length required for parsing a single pixel of the first component, and wherein the exceeded code length of the bitstream buffer is a code length that the stored code length of the bitstream buffer exceeds the set overflow line; and decoding the to-be-decoded block by parsing the pixels on each component in accordance with the fixed code length of the component.

2. The method according to claim 1, wherein determining whether the image block corresponding to the to-be-decoded block is in the fallback mode comprises:

determining the image block corresponding to the to-be-decoded block is in the fallback mode in a case that a code length of encoding the image block corresponding to the to-be-decoded block in the sample mode is greater than or equal to the maximum code length of the to-be-decoded block.

3. The method according to claim 1, wherein determining whether the image block corresponding to the to-be-decoded block is in the fallback mode comprises:

determining the image block corresponding to the to-be-decoded block is in the sample mode in a case that a code length of encoding the image block corresponding to the to-be-decoded block in the sample mode is less than the maximum code length of the to-be-decoded block.

4. The method according to claim 1, wherein determining the fixed code length of each component of the to-be-decoded block based on the exceeded code length of the bitstream buffer comprises:

determining the fixed code length of a luminance component and the fixed code length of a chrominance component of the to-be-decoded block based on the exceeded code length of the bitstream buffer, a target total code length of the to-be-decoded block, and an image format of the to-be-decoded block, wherein the fixed code length of the luminance component indicates a code length required for parsing a single pixel of the luminance component, and the fixed code length of the chrominance component indicates a code length required for parsing a single pixel of the chrominance component, and wherein the target total code length is a total code length required for decoding the to-be-decoded block.

5. The method according to claim 4, determining the fixed code length of the luminance component and the fixed code length of the chrominance component of the to-be-decoded block based on the exceeded code length of the bitstream buffer, the target total code length of the to-be-decoded block, and the image format of the to-be-decoded block comprises:

obtaining a code length of header information of the to-be-decoded block; and determining the fixed code length of the luminance component and the fixed code length of the chrominance component based on the target total code length, the image format, the exceeded code length and the code length of the header information of the to-be-decoded block.

6. The method according to claim 4, wherein a sum of fixed code lengths of all pixels on the luminance component is greater than or equal to a sum of the fixed code lengths of all pixels on the chrominance component.

7. The method according to claim 5, wherein a sum of the fixed code lengths of all components of the to-be-decoded block is less than or equal to the target total code length of the to-be-decoded block minus the code length of the header information of the to-be-decoded block and the exceeded code length of the bitstream buffer.

8. The method according to claim 5, wherein a sum of fixed code lengths of all pixels on the luminance component is greater than or equal to a sum of the fixed code lengths of all pixels on the chrominance component.

9. The method according to claim 1, wherein parsing the pixels of each component in accordance with the fixed code length of the component comprises:

parsing the pixels on a luminance component in accordance with the fixed code length of the luminance component, and parsing the pixels on a chrominance component according to the fixed code length of the chrominance component.

10. The method according to claim 9, wherein parsing the pixels on the luminance component in accordance with the fixed code length of the luminance component comprises:

determining residual values of the luminance component of the to-be-decoded block based on the fixed code length of the luminance component;

obtaining prediction values of the to-be-decoded block by acquiring a prediction mode of the to-be-decoded block in the fallback mode and predicting the image block corresponding to the to-be-decoded block according to the prediction mode;

determining a quantization parameter of the to-be-decoded block, and performing a dequantization on the residual values of the luminance component of the to-be-decoded block according to the quantization parameter; and obtaining a luminance reconstructed block of the image block by reconstructing the to-be-decoded block according to the residual values of the luminance component of the to-be-decoded block after the dequantization and the prediction values.

11. The method according to claim 10, wherein acquiring the prediction mode of the to-be-decoded block in the fallback mode comprises:

a case that the prediction mode of the to-be-decoded block is a prediction mode corresponding to the fallback mode; or, a case that the prediction mode of the to-be-decoded block is one of a plurality of prediction modes of the decoding-side device.

12. The method according to claim 9, wherein parsing the pixels on the chrominance component in accordance with the fixed code length on the chrominance component comprises:

determining residual values of the chrominance component of the to-be-decoded block based on the fixed code length of the chrominance component;

obtaining prediction values of the to-be-decoded block by acquiring a prediction mode of the to-be-decoded block in the fallback mode and predicting the image block corresponding to the to-be-decoded block according to the prediction mode;

determining a quantization parameter of the to-be-decoded block, and performing a dequantization on the residual values of the chrominance component of the to-be-decoded block according to the quantization parameter; and obtaining a chrominance reconstructed block of the image block by reconstructing the to-be-decoded block according to the residual values of the chrominance component of the to-be-decoded block after the dequantization and the prediction values.

13. The method according to claim 12, wherein acquiring the prediction mode of the to-be-decoded block in the fallback mode comprises:

a case that the prediction mode of the to-be-decoded block is a prediction mode corresponding to the fallback mode; or, a case that the prediction mode of the to-be-decoded block is one of a plurality of prediction modes of the decoding-side device.

14. A non-transitory computer-readable storage medium, storing one or more computer programs or instructions, wherein the one or more computer programs or the instructions, when executed by an electronic device, implement the method according to claim 1.

15. An image encoding method, applied to an encoding-side device, the method comprising:

acquiring a maximum code length of a to-be-encoded block, wherein the maximum code length is determined based on a set overflow line of a bitstream buffer, and the set overflow line indicates a maximum storage space allowed to be occupied by bitstreams in the bitstream buffer;

obtaining a first code length of the to-be-encoded block by pre-encoding the to-be-encoded block, wherein the first code length is a length of a bitstream obtained after pre-encoding the to-be-encoded block; and encoding the to-be-encoded block in a fallback mode in a case that the first code length is greater than or equal to the maximum code length, wherein a code length obtained by encoding the to-be-encoded block in the fallback mode is less than the maximum code length, and wherein a bitstream obtained by encoding the to-be-encoded block in the fallback mode comprises a first codeword, and the first codeword indicates the fallback mode or a sample mode, wherein the method further comprises:

determining a fixed code length of a luminance component and a fixed code length of a chrominance component of the to-be-encoded block based on an exceeded code length of the bitstream buffer in a case that a stored code length of the bitstream buffer exceeds the set overflow line, wherein the fixed code length of the luminance component indicates a code length required for encoding a single pixel of the luminance component, and the fixed code length of the chrominance component indicates a code length required for encoding a single pixel of the chrominance component, and wherein the exceeded code length of the bitstream buffer is a code length of the stored code length of the bitstream buffer exceeding the set overflow line; and encoding the to-be-encoded block in accordance with the fixed code length of the luminance component and the fixed code length of the chrominance component.

16. A non-transitory computer-readable storage medium, storing one or more computer programs or instructions, wherein the one or more computer programs or the instructions, when executed by an electronic device, implement the method according to claim 15.

17. An encoding-side device, comprising
one or more processors, and
one or more memories that are configured to store computer instructions,
wherein the one or more processors are configured to call from the one or more memories and execute the computer instructions to implement the method according to claim 15.

18. A decoding-side device, comprising
one or more processors, and
one or more memories that are configured to store computer instructions,
wherein the one or more processors are configured to call from the one or more memories and execute the computer instructions to:
parse a bitstream of a to-be-decoded block, and determine whether an image block corresponding to the to-be-decoded block is in a fallback mode in a case that the bitstream of the to-be-decoded block comprises a first codeword, wherein a code length of the to-be-decoded block is less than a maximum code length of the to-be-decoded block, the maximum code length is determined based on a set overflow line of a bitstream buffer, and the set overflow line indicates a maximum storage space allowed to be occupied by bitstreams in the bitstream buffer, and wherein the first codeword indicates the fallback mode or a sample mode;
determine a fixed code length of each component of the to-be-decoded block based on an exceeded code length of the bitstream buffer in a case that the image block corresponding to the to-be-decoded block is in the fallback mode and a stored code length of the bitstream buffer exceeds the set overflow line, wherein the to-be-decoded block comprises one or more components, and for a first component of the to-be-decoded block, the fixed code length of the first component indicates a code length required for parsing a single pixel of the first component, and wherein the exceeded code length of the bitstream buffer is a code length that the stored code length of the bitstream buffer exceeds the set overflow line; and
decode the to-be-decoded block by parsing the pixels on each component in accordance with the fixed code length of the component.

* * * * *